United States Patent [19]

Phillips et al.

[11] 4,349,728

[45] Sep. 14, 1982

[54] TARGET APPARATUS

[75] Inventors: Robert B. Phillips, Hants; William H. Bowyer, Farnham; Bruce Moxley, Reading, all of England

[73] Assignee: Australasian Training Aids Pty. Ltd., Albury, Australia

[21] Appl. No.: 101,191

[22] Filed: Dec. 7, 1979

[30] Foreign Application Priority Data

Dec. 7, 1978 [GB] United Kingdom ............... 47598/78

[51] Int. Cl.³ .......................... G06F 15/20; F41J 5/12
[52] U.S. Cl. ..................... 235/400; 273/372; 364/423; 367/127; 367/906; 434/1
[58] Field of Search ............. 235/400; 367/127, 906; 273/371, 372, 373; 364/423; 434/1, 19

[56] References Cited

U.S. PATENT DOCUMENTS

| 2,925,582 | 2/1960 | Mattei et al. | 273/372 X |
| 3,489,413 | 1/1970 | Groder et al. | 273/372 |
| 3,678,495 | 7/1972 | Gilbert | 273/372 X |
| 3,707,699 | 12/1972 | Sanctuary | 273/372 X |
| 3,778,059 | 12/1973 | Rohrbaugh et al. | 273/372 |
| 4,261,579 | 4/1981 | Bowyer et al. | 273/372 |

FOREIGN PATENT DOCUMENTS

| 869979 | 12/1978 | Belgium . | |
| 880019 | 3/1980 | Belgium . | |
| 7726275 | 3/1978 | Fed. Rep. of Germany . | |
| 2807101 | 8/1978 | Fed. Rep. of Germany | 273/372 |
| 1555299 | 1/1969 | France . | |
| 526763 | 8/1972 | Switzerland | 273/372 |
| 2036324 | 6/1980 | United Kingdom . | |

Primary Examiner—Felix D. Gruber
Attorney, Agent, or Firm—Schwartz, Jeffery, Schwaab, Mack, Blumenthal & Koch

[57] ABSTRACT

A target apparatus, having a framework covered by sheets of material to form a chamber the sheets of material being penetrable by a projectile, such as a bullet, fired at the target. A plurality of transducers are positioned at respective spaced-apart locations within the chamber and lying on an arc of a circle, for detecting shock or pressure waves in the chamber caused upon penetration of the sheets of material by the projectile. Time differences between instants of detection of a shock or pressure wave by the transducers are measured, the location at which the projectile penetrated the sheet of material being determined from the time differences. Preferably, a bull's-eye or aiming mark is provided on the target, the center of which is aligned with the center of the circle on which the transducers lie. Apparatus is also disclosed for determining the speed of sound in air within the chamber, enabling the projectile penetration point to be determined with particular accuracy.

24 Claims, 32 Drawing Figures

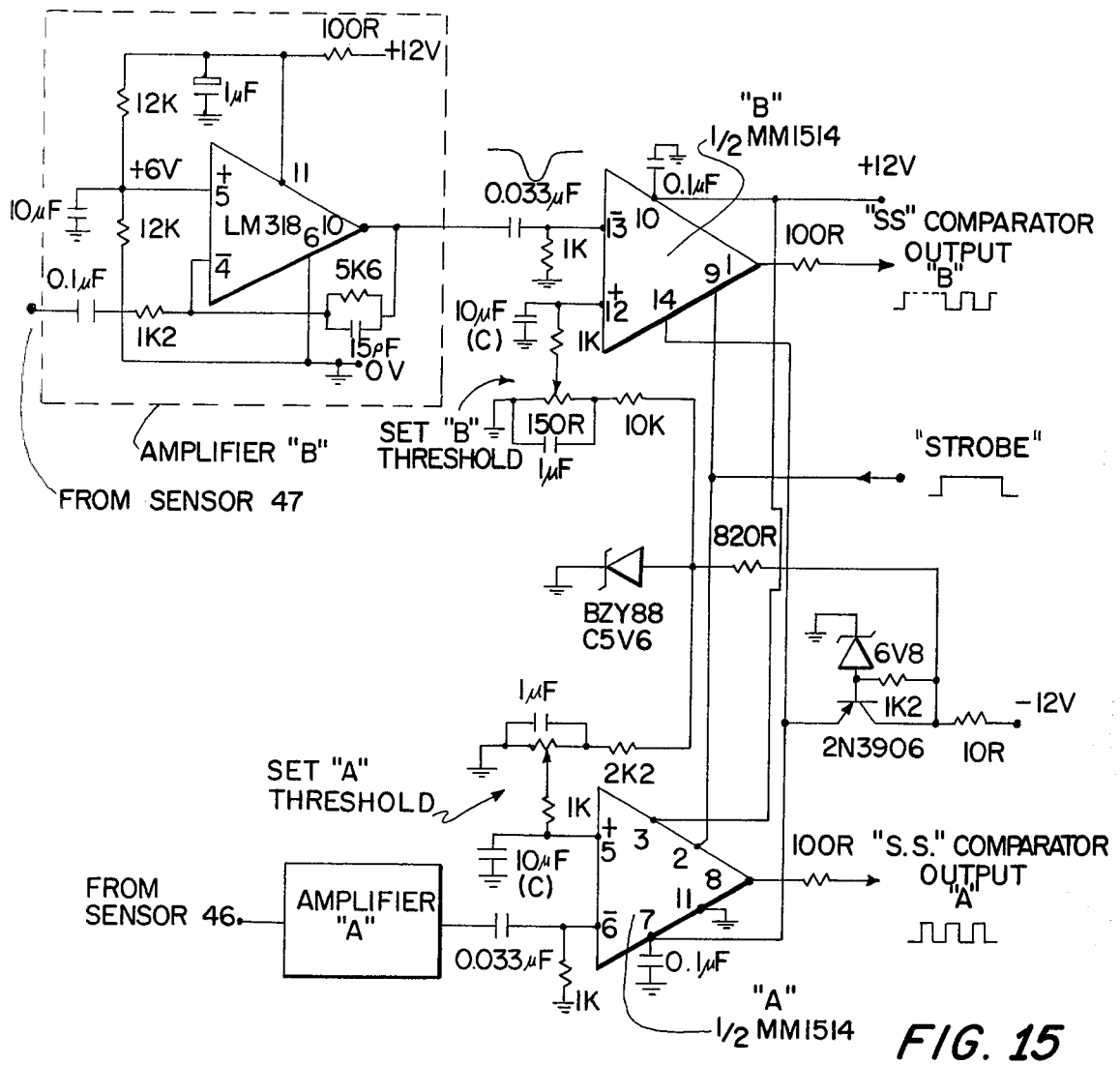
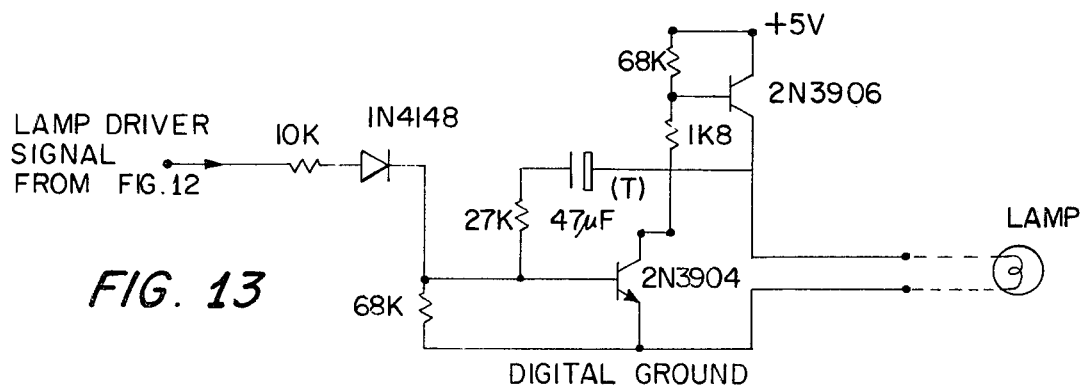
FIG. 15
FIG. 13

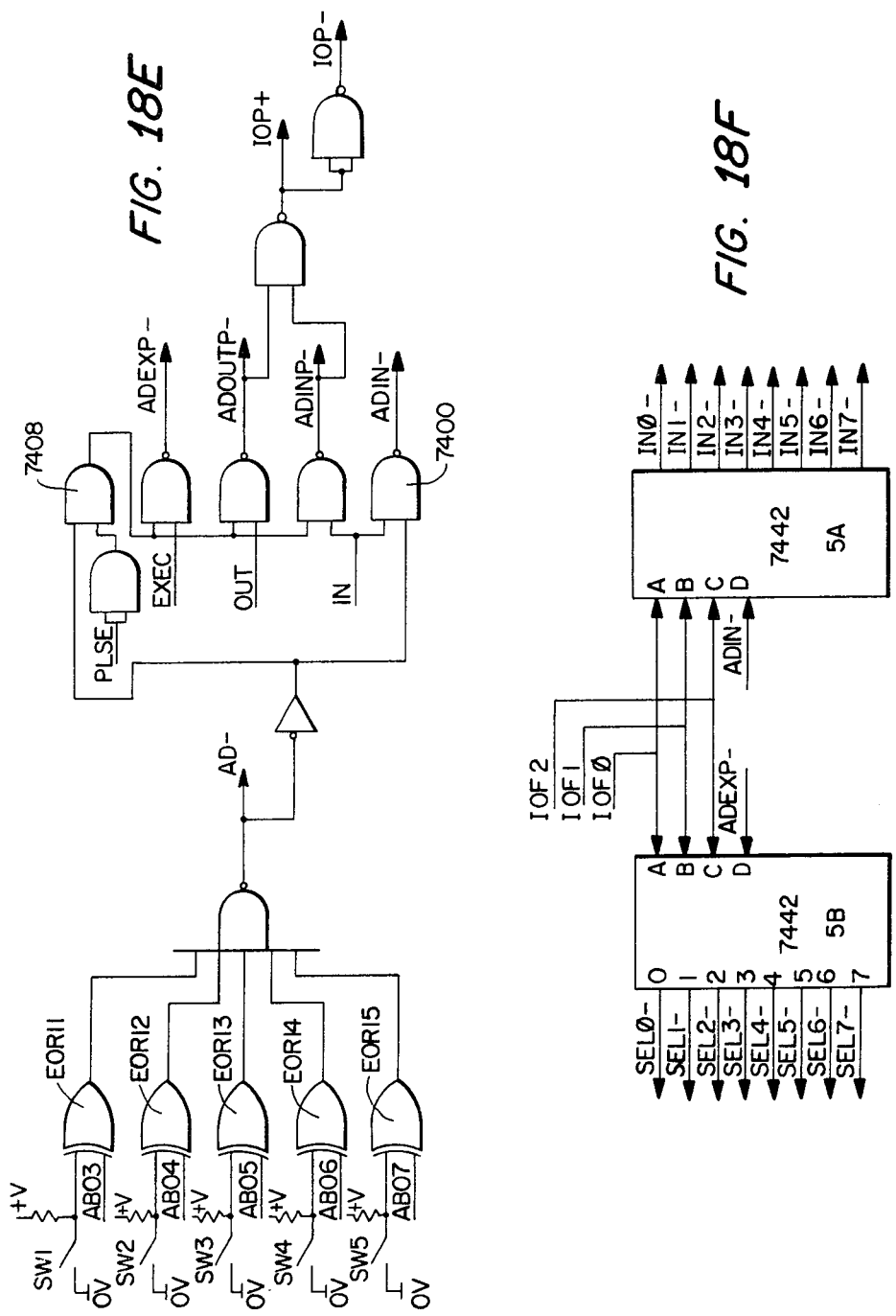

TARGET APPARATUS

DESCRIPTION

BACKGROUND OF THE INVENTION

The invention relates to target apparatus for determining and indicating the location at which a projectile has penetrated a face of the target.

THE PRIOR ART

German Utility Model Application DE-GM No. 77 26 275, published Mar. 16, 1978, discloses a target system comprising a framework constituting an outer periphery of the target. The framework is provided with front and rear sheets of a flexible rubber-like material to form an anechoic chamber. A plurality of transducers is located within the chamber. A bullet fired at the target passes through the rubber-like sheets and, thus, through the anechoic chamber. As the bullet passes through the anechoic chamber, a shock or pressure wave is generated which expands radially outwardly from the path of the bullet between the two outer skins of the chamber. The shock or pressure wave impinges on the transducers. By measuring the time of arrival of the shock or pressure wave at each transducer, it is possible to calculate the position at which the bullet has passed through the target, provided that the precise position of each transducer is known, the speed of sound in air within the anechoic chamber is known, and the speed of the bullet is known.

SUMMARY OF THE INVENTION

The present invention provides improvements in the above-mentioned prior art target apparatus.

According to one aspect of the invention, there is provided a target apparatus comprising a framework covered by at least one sheet of material to form a chamber, the material being penetrable by a projectile. A plurality of transducers are positioned at respective spaced-apart locations within the chamber and lying on an arc of a circle, for detecting shock or pressure waves in the chamber caused upon penetration of the sheet of material by the projectile. Apparatus responsive to the transducers is provided for measuring time differences between instants of detection of a shock or pressure wave by the transducers. Further apparatus responsive to the time difference measuring apparatus determines and indicates a location at which the projectile has penetrated the sheet of material.

A significant over the above-mentioned prior art apparatus is provided by the disposition of the transducers on the arc of a circle. That is, a zone is created about the origin of the arc on which the transducers lie (i.e., the center of the circle of the arc) in which the determined projectile penetration locations are substantially independent of the propagation velocity of sound in air within the chamber. As a result, one variable in the calculation of projectile penetration location is eliminated, significantly improving the overall accuracy of projectile penetration location determination. Experimental results and computer modeling by the inventors suggest that the positioning of the transducers on the arc of a circle improves overall accuracy by a factor of two over the prior art target having transducers located along a straight line on a beam. The principal—and acceptable—penalty of placing the transducers on an arc of a circle lies in increased complexity and quantity of mathematics required to be performed in obtaining "hit" positions (locations at which the projectile has penetrated the sheet of material defining a wall of the enclosed chamber). The mathematical operations required to obtain "hit" positions are preferably carried out by a suitably programmed general-purpose computer.

In the preferred form of the invention, three transducers are provided within the chamber for detecting the shock or pressure wave caused within the chamber upon penetration by a projectile such as a bullet. It is preferred that the center of the circle (along an arc of which the transducers are located) is aligned with a bull's-eye or aiming mark provided on the target. The bull's-eye or aiming mark may be printed on or otherwise affixed to or positioned adjacent a surface of the target defined by a sheet of material covering the framework.

Apparatus is preferably also provided for measuring the propagation velocity of sound in air within the target chamber. In one form of the invention, the propagation velocity measuring apparatus comprises a device for transmitting a sound pulse, apparatus spaced from the sound pulse transmitting device for detecting the sound pulse, and apparatus responsive to the sound pulse detecting apparatus for measuring a time taken for the sound pulse to travel a known distance and for determining therefrom the propagation velocity of sound in air within the chamber. The detecting apparatus most preferably comprises a pair of transducers spaced at the known distance from one another, within the chamber. Alternatively, the detecting apparatus may comprise a single transducer spaced at the known distance from the sound pulse transmitting means.

In another form of the invention, the propagation velocity measuring apparatus comprises apparatus for measuring either the temperature or temperature and relative humidity of air within the target chamber, and apparatus responsive thereto for calculating a value representing the propagation velocity of sound in air within the target chamber.

In one advantageous feature of the invention, compensation is made for variations of transducer locations with temperature, the transducers being mounted, for example, on a beam which has a known coefficient of expansion.

BRIEF DESCRIPTION OF THE DRAWINGS

FIG. 13 shows a preferred circuit arrangement for a pulse-stretching lamp driver circuit;

FIGS. 14 and 15 show in detail the circuitry for "speed of sound" measurement control and sequencing logic;

FIGS. 18A-18H show a preferred arrangement for the timer interface unit of FIG. 17;

DETAILED DESCRIPTION OF PREFERRED EMBODIMENTS

Figure 1:
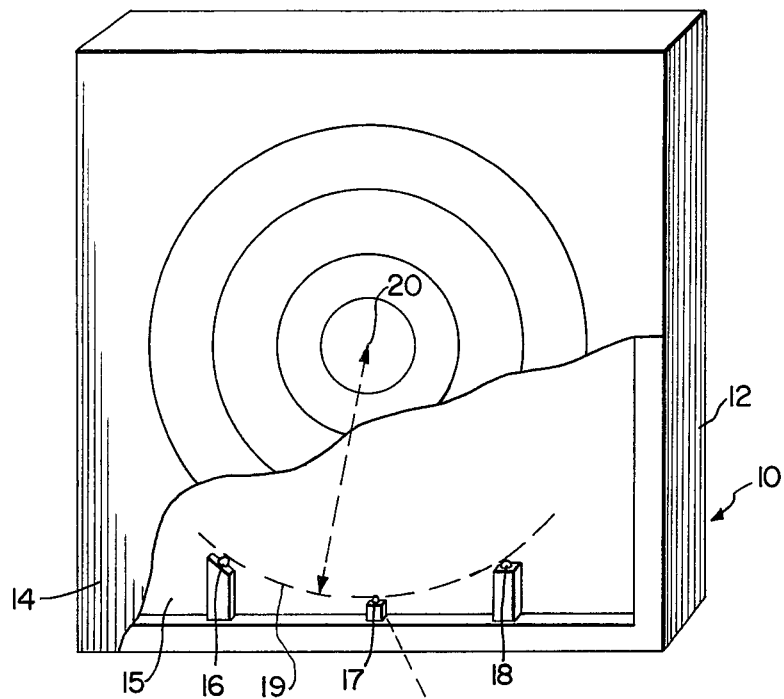
FIG. 1 shows a target assembly in accordance with the invention in partially cut-away perspective view.

FIG. 1 shows in partially cut-away perspective view a target assembly 10 in accordance with the present invention. The target assembly comprises a framework 12 covered on the front and rear surfaces with sheets of material 14, 15, respectively, to define a hollow target chamber. The front and rear sheets of material prevent shock waves generated outside the chamber from entering the chamber and, since the two sheets are co-parallel and spaced apart, they tend to guide any shock or pressure wave generated within the chamber so that such shock or pressure wave will expand radially in a direction parallel to the planes of sheets 14, 15. Thus, such a shock or pressure wave expands radially outwardly from the shock or pressure wave source.

A target representation is positioned relative to the front sheet of material 14, shown in FIG. 1 as a series of concentric rings. Of course, any other target representation or aiming mark may be used, and the target representation or aiming mark may be printed on or applied directly to the front sheet of material 14, printed on a sheet of paper secured to front sheet 14, or otherwise provided.

Three transducers 16, 17, 18 are provided within the anechoic chamber, adjacent the lower edge of the chamber. The transducers are located on an arc of a circle (represented by dashed line 19), the circle having its center point 20 aligned with the center of the bull's-eye target representation (or other aiming mark).

Thus, transducers 16, 17, 18 are not located along a horizontal straight line, as has been the previous practice, but lie on a curve. It has been found that with the transducers located along the arc of a circle as shown in FIG. 1 it is possible to obtain increased accuracy in calculating the location at which a bullet or other projectile passes through the target arrangement, for locations in the important central region of the target. There are two reasons for this. First, each transducer pair defines a set of hyperbolic curves, each set of curves having a central axis perpendicular to a line joining the two transducers and intersecting that line at the midpoint thereof. The hyperbolic curves defined by each transducer pair intersect at right angles to each other at a point lower on the target when the transducers lie along a straight line than when the transducers lie along a curve. Since optimum accuracy is obtained in the region where the hyperbolic curves intersect substantially at right angles, locating the transducers along a curve places the maximum accuracy zone near the center of the target. Second, when a shock or pressure wave is generated from any point on a central axial line through the transducer array, two transducers each receive the shock or pressure wave at the same instant. With the transducers located on the arc of a circle having, at its center point, the center of the bull's-eye or other aiming mark, all transducers receive simultaneously a shock or pressure wave generated by a bullet or other projectile passing through the target at the bull's-eye. This minimizes the significance of the velocity of sound in air in calculating the location at which the projectile passes through the target.

Connected to transducers 16, 17, 18 is a timing apparatus (not shown in FIG. 1) which measures the difference in time between instants of reception of the shock or pressure wave by the transducers. These time differences are utilized in an appropriately programmed computer to calculate the precise location at which the shock or pressure wave detected by the transducers originated. Such location can be considered the position at which the bullet or other projectile has penetrated the target.

The propagation velocity of sound in air ("speed of sound") within the anechoic chamber is, in many instances, of importance in calculating the location at which the pressure wave detected by the transducers originated. It is accordingly contemplated that means be provided for determining the speed of sound in air within the anechoic chamber, for use in such calculations. Such means may comprise, for example, an ultrasonic transducer for transmitting a sound wave in air, and a transducer adapted to receive the transmitted sound wave. The time of "flight" of the sound wave can thus be measured and, if the distance between the transmitting transducer and the receiving transducer is known, the speed of sound in air can be calculated. However, the speed of sound in air is dependent upon many factors, the most important of which are temperature and relative humidity. It is thus contemplated that it may be economically preferable to provide apparatus for measuring at least one of the parameters which principally affect the speed of sound in air, i.e., either temperature or temperature and relative humidity, and supply signals representative of the measures value(s) to a computer or other means for calculating, from the measured values, the speed of sound in air within the anechoic chamber.

It has been found preferable to utilize transducers comprising circular disks or circular sectioned rods of piezoelectric material. For example, each of transducers 16, 17, 18 may comprise such a disk or rod of piezoelectric material located within the target chamber so that one round face thereof is substantially parallel with the front sheet 14 of the target assembly. While it is desired to have each transducer detect shock or pressure wave arrival at a point (i.e. at the center of the transducer), it will be recognized that the transducers begins to produce an output signal when the shock or pressure strikes the outer surface of the transducer. A constant timing error is thus introduced, related to the radius of the circular cross-section of the piezoelectric material, regardless of the direction in which the shock or pressure wave approaches the transducer. Since time differences are measured, the inclusion of a constant timing error for all transducers does not adversely affect the determination of the shock or pressure wave source location, since the timing errors are self-cancelling.

Figure 2:
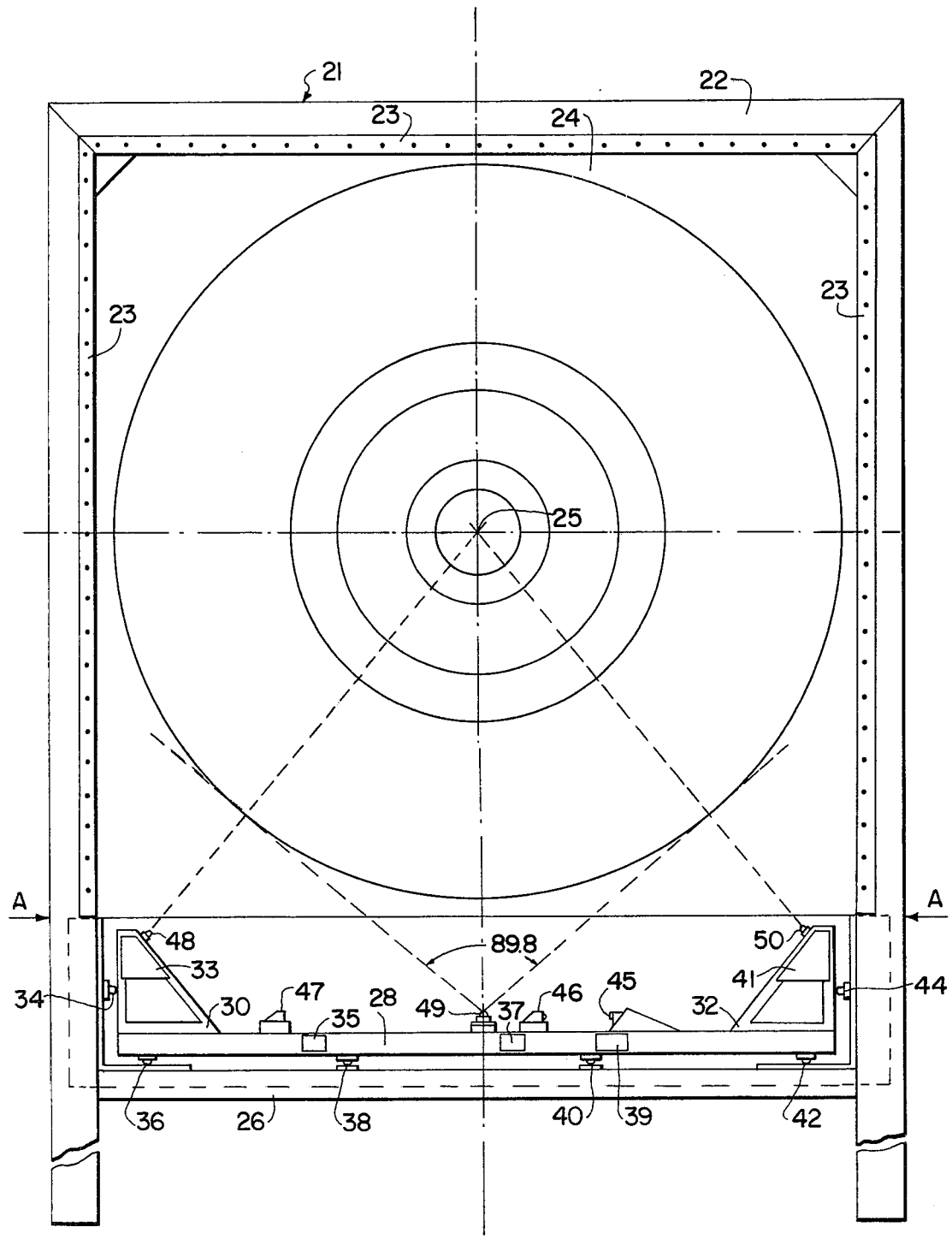
FIG. 2 shows a front elevational view of a preferred target assembly construction, with a lower front cover panel removed.

FIG. 2 shows a front elevational view of a preferred target assembly 20. The assembly includes a rigid rectangular frame constructed preferably of hard wood, having an external width of approximately 2 meters. A flexible membrane 24 covers the front of target frame 22 down to line A-A. A similar membrane (not shown in FIG. 2) covers the rear of target frame 22. A suitable material for the front and rear membranes is 3 millimeter thick "Linatex" available from Linatex Australia Ltd., Sinclair Road, Dandong, Victoria, Australia. It will be understood, however, that other suitable materials may be used for the front and rear membranes, such as neoprene foam material, plastazote, or other materials having suitable properties. The lower section of frame 22 includes a cross-member 26 of hardwood. The lower interior portion of target frame 22 between cross-member 26 and line A-A is covered with 8 millimeter thick hardwood plywood, both front and rear, thereby defining a cavity for receiving the transducers and associated components.

A sensor support beam 28 extends within the lower portion of the target chamber, and carries outer sensor support brackets 30, 32. Sensor support beam 28 and support brackets 30, 32 form a sensor bar assembly which is mounted to the side members and cross-member 26 of target frame 22 by means of anti-vibration mountings 34-44. Suitable anti-vibration mountings 34-44 are, for example, Type No. E220240 manufactured by Barry Controls Inc., 700 Pleasant Street, Watertown, Massachusetts, U.S.A. Mounted on support beam 28 is an acoustic pulse source 45 and sensors 46, 47, employed for speed of sound measurement. Sensors 48, 49, 50 are mounted on the sensor bar assembly at spaced-apart locations along an arc of constant radius having an origin aligned with the center 25 of the bull's-eye represented on front membrane 24. Hardwood trapping strips 23 serve to retain the front and rear flexible membranes on the target frame.

Although the target arrangement of FIG. 2 may be constructed in any suitable dimension, it is contemplated that the outermost ring of the concentric rings forming a bull'-eye on the front membrane 24 of the target be nearly 2 m in diameter. A target of this size is suitable for target practice over a distance of approximately 500 m. In use, the target frame 21 is mounted, for example, behind a mantlet which shields the lower portion of the target assembly lying below line A-A in FIG. 2. Such mantlet may comprise an earthen embankment and/or concrete shield for preventing the sensor support beam 28 and components mounted thereon from being damaged by bullets or other projectiles fired at the target.

Figure 3:
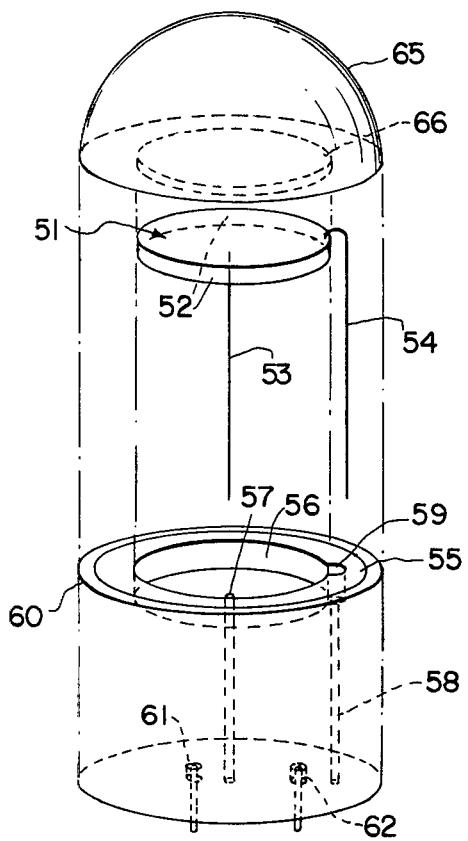
FIG. 3 shows an exploded perspective view of one possible form of "position measuring" sensor construction.
Figure 4:
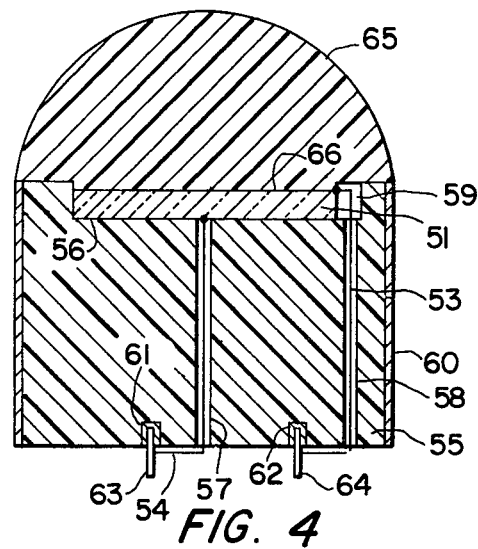
FIG. 4 shows an assembled elevational cross-sectional view of the transducer construction of FIG. 3.
Figure 5:
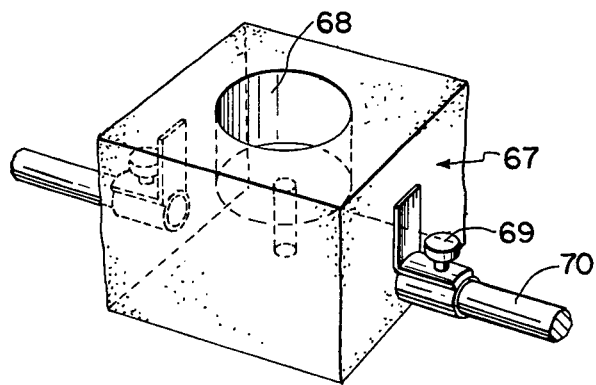
FIG. 5 shows in schematic perspective view an acoustic decoupling mounting arrangement for the transducer of FIGS. 3-4.

Any of a number of constructions may be employed for transducers 48, 49, 50 of FIG. 2, but one advantageous construction is illustrated in exploded perspective view in FIG. 3 and in assembled, elevational cross-sectional view in FIG. 4. The transducer assembly comprises a disk 51 of piezoelectric material such as, for example, lead zirconium titanate, of 1-2 millimeter thickness and 5 millimeter diameter. A commercially-available piezoelectric element of this size is, for example, Type MB1040, available from Mullard, Ltd., Torrington Place, London WC1, England. The opposed planar faces of disk 51 are coated with a conductive material 52, which may be silver provided by vacuum deposition, or a conductive epoxy resin, such as type 3021 available from Acme Chemicals and Insulation Company, New Haven, Connecticut, U.S.A. Two electrically conductive wires 53, 54, for example, of copper or gold, are connected to the center of the lower surface of the disk and to the periphery of the upper surface of the disk by soldering, ultrasonic bonding, conductive epoxy resin, or other means. The disk 52 is then firmly mounted in a housing which comprises a cylindrical member 55 having a 5 millimeter diameter recess 56 in one end face thereof, recess 56 having a depth of 1.5 millimeters and opening into an axial bore 57 extending through member 55 to accomodate wire 53 provided on the lower surface of the piezoelectric member. A second bore 58, parallel to bore 57, is formed in the periphery of member 55, bore 58 accommodating wire 54 and terminating in an open recess 59 adjacent the main recess 56. Member 55 may be formed of Tufnol, a phenolic resin bonded fabric commercially available in cylindrical form. The housing may be machined from this material or may be formed of a two-part phenolic resin such as that sold under the trademark "Araldite," the resin being retained in a cylindrical aluminum case 60 and subsequently being machined. Aluminum case 60 may be grounded to provide a Faraday cage to minimize noise. The piezoelectric material and wires are bonded into member 55 with an adhesive such as Araldite or a cyano acrylic impact adhesive. Two small bores 61, 62 are formed in the lower surface of the member 55, electrically conducting pins 62, 63 being mounted in the bores. Wires 53, 54 protrude from the lower ends of bores 57, 58 and are soldered to conducting pins 62, 63, respectively. An adhesive or other suitable setting material is utilized to retain all the elements in position and to secure a solid hemispherical dome 65 to the transducer. Dome 65 may be machined from aluminum or cast from a setting resin material such as that sold under the trademark "Araldite," or an epoxy resin such as type MY 750, mixed with hardener type HY956, available from CIBA-Geigy Ltd., Duxford, Cambridge CB24QA, U.K. Dome 65 preferably has an outer diameter of about 8 millimeters, approximately equal to the outer diameter of the housing. A centrally disposed projection 66 on the base of the dome member contacts piezoelectric disk 51 and is of the same diameter as disk 51. Alternatively, dome 65 and member 55 may be cast as a single integral unit.

Pins 63, 64 are connected to a coaxial cable (not shown) and the entire connection may be encapsulated in soft rubber or the like. The coaxial cable is preferably kept short (up to 1 m in length) and is connected to a suitable amplifier. Alternatively, the pins 63, 64 are connected directly to a printed circuit board upon which an amplifier is mounted, the printed circuit board being potted to the base of the housing.

It is important that both the transducer assembly and any cable leading from the assembly be acoustically decoupled from the sensor bar assembly of FIG. 2. For this purpose, each transducer assembly may be mounted on a block of any suitable acoustic decoupling medium, such as an expanded polymer foam, for example, foam polyethylene sold under the trademark "Plastazote" by Bakelite Xylonite Ltd. Of course, any other suitable acoustic decoupling material may be used, such as glass fiber cloth or mineral wool.

Figure 11:
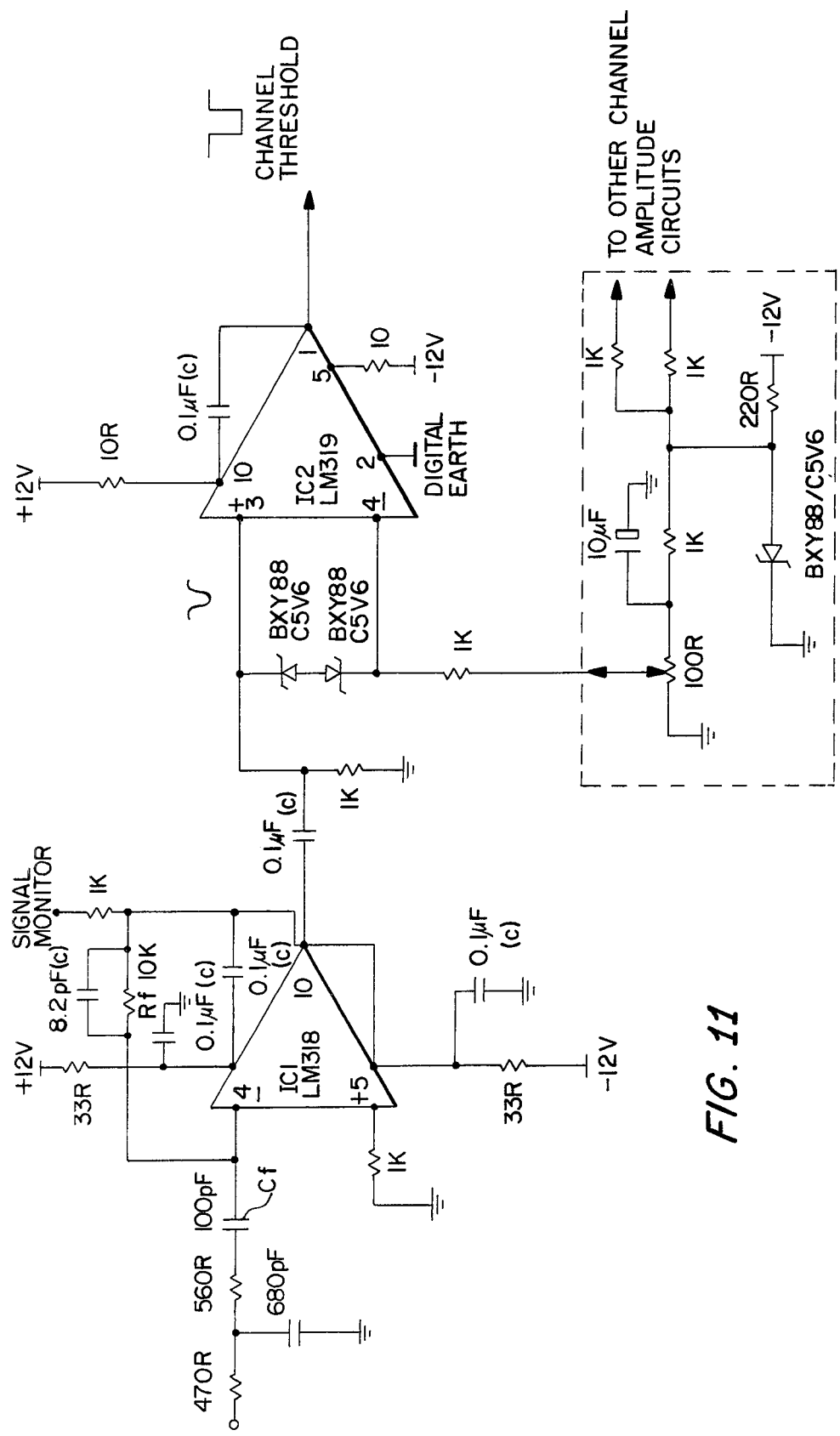
FIG. 11 shows a preferred circuit arrangement for signal shaping and threshold detecting in one of the sensor signal channels.

The transducer assembly may be mounted, for example, in a recess 68 in a block 67 of acoustic decoupling medium as illustrated in FIG. 11. The entire block may then be clamped in an convenient way, such as by clamps 69 to a suitable support 70, clamps 69 and support 70 being illustrated schematically. Support 70 may then in turn be suitably affixed at the appropriate locations on the sensor bar assembly of FIG. 2.

Figure 6:
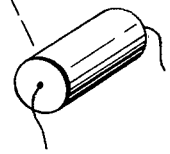
FIG. 6 shows in elevational cross-sectional view a "speed of sound" sensor assembly.
Figure 6:
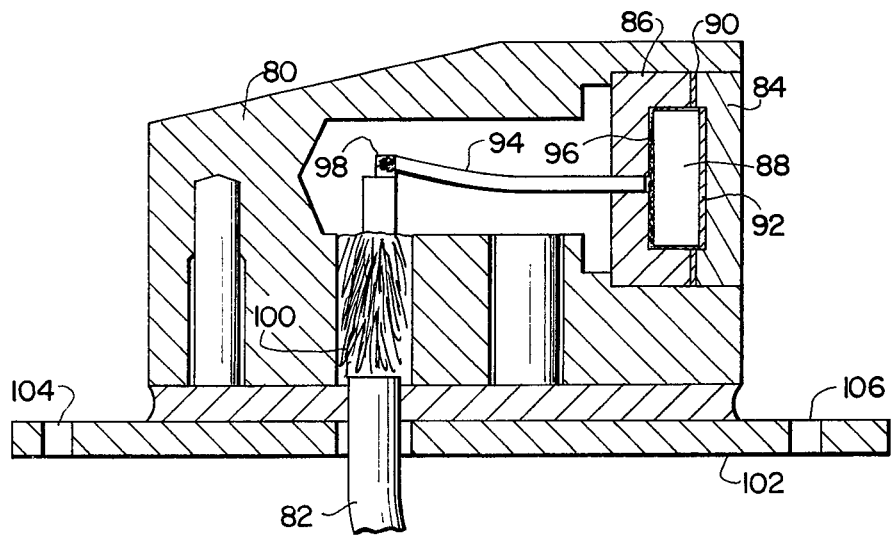

FIG. 6 shows in elevation and in substantially expanded scale a cross-sectional view of a sensor assembly suitable for use as velocity of sound sensors 46, 47 of FIG. 2. The sensor assembly of FIG. 6 comprises an outer housing 80, preferably fabricated from aluminum. A coaxial connecting cable 82 (for example, type RG174/U) extends into an opening in the lower portion of housing 80. Members 84 and 86 are fabricated from an epoxy resin (for example, hardener type HY956 and resin type MY 750, available from CIBA-Geigy Ltd.). Members 84 and 86 have respective recesses dimensioned to receive and make intimate mechanical contact with a piezoelectric disk 88, for example, of type MB 1043, available from Mullard Ltd., Torrington Place, London WC1, U.K. A thin coating of conductive epoxy resin (for example, type 3021, available from Acme Chemicals and Insulation Company, New Haven, Connecticut, U.S.A.) 90 forms a conductive path from the front face 92 of element 88 to outer housing 80. A fine gauge conductive wire 94 makes electrical contact between the rear face 96 of element 88 and the center conductor 98 of coaxial cable 82. It is noted that the thin coating of conductive epoxy 90 extends over the front face 92 of element 88, serving two purposes: first, it provides electrical contact between the front face 92 of element 88 and housing 80; second, it provides an electrical screen to prevent pick up of electrical interference. The braided shield 100 of coaxial cable 82 is soldered to housing 80. Housing 80 is affixed to a mounting plate 102 having mounting holes 104, 106 by a layer of vibration isolating material (for example, type "3110" R.T.V. Encapsulant and type "S" R.T.V. Catalyst, available from Dow-Corning Corp., Midland, Mich., 48640 U.S.A.), of approximately 2 millimeter thickness, the vibration isolating material mechanically bonding housing 80 to mounting plate 102.

With reference to FIG. 2, a high voltage pulse generator (described below) applies a high voltage pulse to an acoustic pulse source 45 (also described below). The resulting fast rise-time acoustic pulse propagates across the target chamber, first striking sensor 46 and later striking sensor 47. When this acoustic pulse strikes the front face of one of transducers 46, 47, the vibrations are transmitted by front element 84 (FIG. 6) to piezoelectric element 88 (FIG. 6), where they cause an electrical potential to be generated, which is conducted by coaxial cable 82 to a nearby low-noise amplifier also described below.

Figure 7:
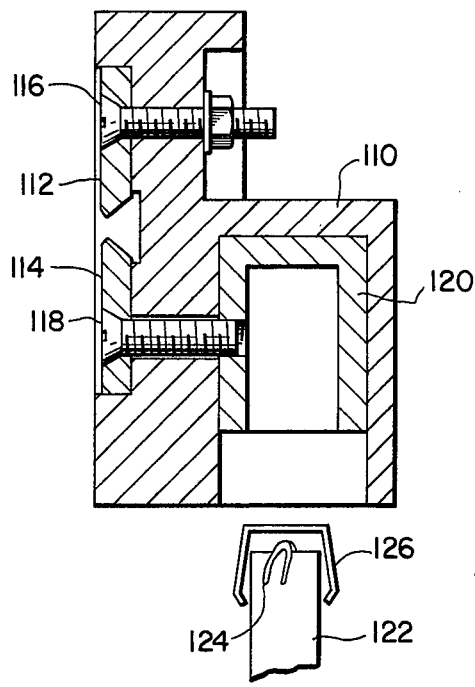
FIG. 7 shows in cross-sectional elevational view a preferred spark gap assembly construction.

The acoustic pulse generator is part of the velocity of sound measuring system described below, and basically consists of a spark gap across which a high voltage causes a short, abrupt electrical discharge (spark) which generates a very fast rise-time airborne pressure wave. FIG. 7 shows in cross-sectional, elevational view a preferred construction for the spark gap assembly. The assembly comprises a housing 110 fabricated, for example, from polycarbonate, available from Bearing Service Co., Melbourne, Victoria, Australia. Discharge electrodes 112, 114 are located in a recess in housing 110 at spaced-apart locations. Discharge electrodes 112, 114 are preferably fabricated from case-hardened mild steel and secured to housing 110 by screws 116, 118, respectively. Screw 116 serves as a low voltage terminal, while screw 118 is received in a threaded bore in a wall of a high voltage socket contact 120. A high voltage supply cable 122 having a contact wire 124 is provided with a contact cap 126 for insertion into high voltage socket contact 120.

Figure 8:
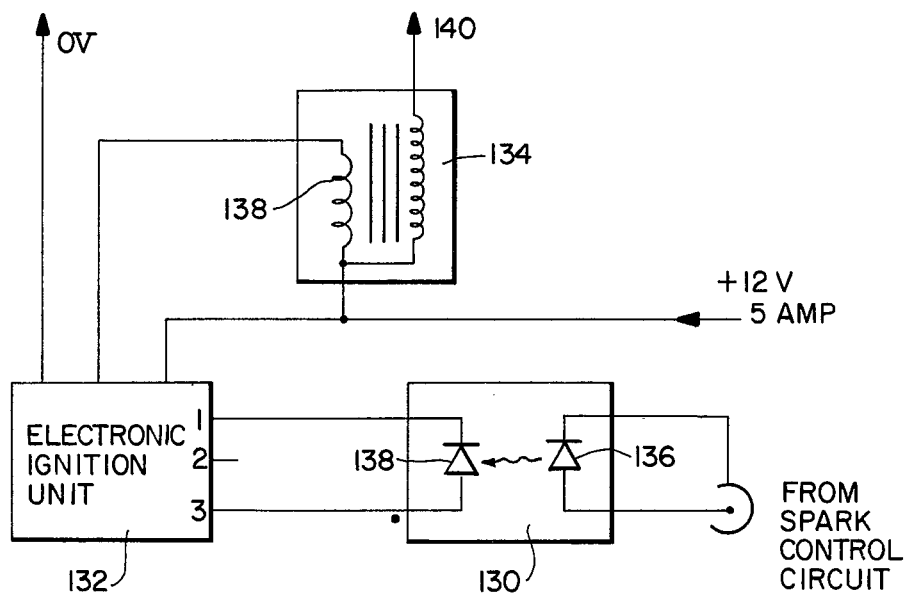
FIG. 8 shows a preferred high voltage pulse generator circuit.

FIG. 8 shows a preferred arrangement for the high voltage pulse generator, comprising an optical coupler 130 (for example, type 306061, available from Radio Spares Components Ltd., P.O. Box 427, 13–17 Epworth St., London EC2P 12HA, U.K.), an electric current control unit 132 (for example, the "Piranha" electronic ignition unit, manufactured by Dynamo & Electrical Services Ltd., Unity Works, Pearson Street, Blackburn, Lancs., U.K.), and a high voltage impulse transformer 132 (for example, type 9220061308U-KO12V automotive ignition coil, available from Robert Bosch, Stuttgart, West Germany). The electronic ignition unit 132 is connected to transformer 134 as described in the technical information supplied by the manufacturer with the former. However, the input control circuit intended to be used with the electronic ignition unit 132 is discarded in favor of optical coupler 130, as shown in FIG. 8.

Under quiescent conditions, a spark control circuit (described below) causes a current to flow through light emitting diode 136, forming the input side of optical coupler 130. This in turn causes a light-sensitive device 138, forming the output side of optical coupler 130, to assume a low impedance; that is, device 138 is in the conductive state. Under these conditions, electronic ignition unit 132 is in its "off" state and no current flows into impulse transformer 134.

When it is desired to cause an acoustic pulse to be generated, the spark control circuit first terminates the current flowing into light emitting diode 136. This causes the light-sensitive device 138 to go to its high impedance state which, in turn, causes electronic ignition unit 132 to switch "on" Current begins to flow in the low tension windings 138 of transformer 134. After a suitable delay during which the current in the low tension winding builds up to its maximum, the spark control circuit reapplies current to light emitting diode 136. This results in a current flowing through low tension windings 138 being abruptly interrupted by electronic ignition unit 132, resulting in a very fast and a very large voltage pulse appearing at the high tension connection 140 of transformer 134. This is coupled to the acoustic pulse source shown in FIG. 7 via high tension cable 122, resulting in a spark discharge between electrodes 112, 114, which in turn creates the requisite fast rise-time airborne pressure wave.

Figure 9:
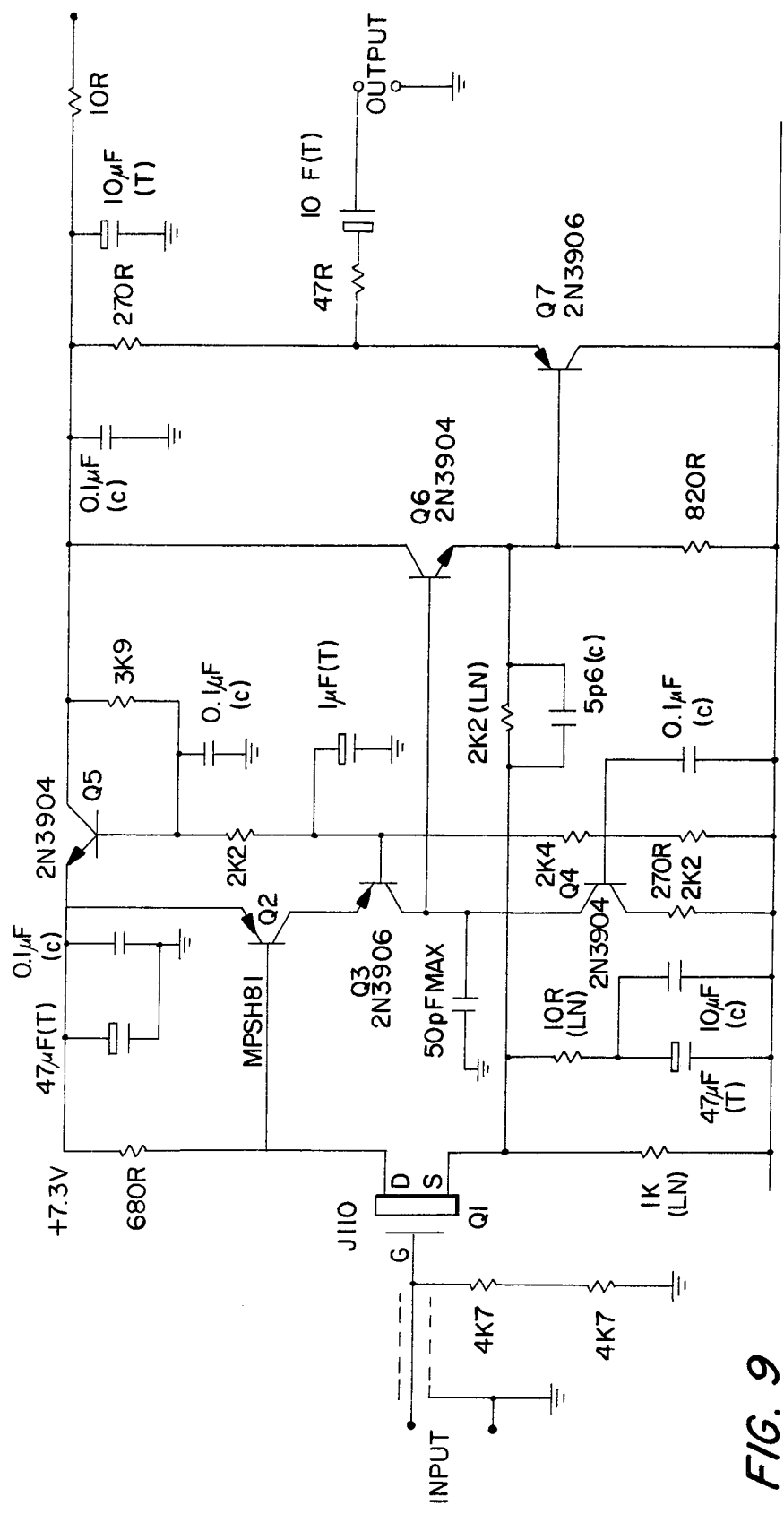
FIG. 9 shows a preferred circuit arrangement of a low-noise, wide-band amplifier for use with each of the sensors.

FIG. 9 shows one possible circuit arrangement for a low-noise, wide-band amplifier for use with each of the five acoustic sensors 46-50 fitted within the target frame of FIG. 2 (three "position measuring" sensors 48-50 and two "velocity of sound" measuring sensors 46, 47).

Operation of the circuit of FIG. 9 is as follows. The gate "G" and source "S" terminals of input device Q1 can be regarded as the non-inverting and inverting input terminals of a high voltage gain, wide-band amplifier, the output point of which is the emitter terminal of transistor Q6. At the frequencies of interest, the overall gain is controlled by negative feedback to the inverting input by way of a restrictive divider network formed by the 2200 ohm and 10 ohm resistors, marked "LN" to indicate that they should be low-noise type components. When a sensor connected to the amplifier input terminal generates a small positive-going voltage, current flowing through transistor Q1 increases, and is fed to the base of transistor Q2, which then results in an amplified increase in the collector current of transistor Q2 (type MPSH81, available from Motorola Semiconductors). This amplified current flows through transistor Q3, which forms a common-base buffer stage and creates a very large voltage change at the junction of the collectors of transistors Q3 and Q4 (transistor Q4 forms a high voltage output impedance constant-current collector load for transistor Q3). This voltage is fed via emitter follower buffer stage Q6 to the upper end of the above-mentioned resistive divider chain. A proportion of this voltage appears at the junction of the 2200 ohm and 10 ohm low noise resistors with the source "S" terminal of transistor Q1, thereby forming the negative feedback, stabilizing the overall gain at approximately 200. Transistor Q7 further buffers the amplifier output, which then connects via a DC decoupling capacitor to the output terminals. Transistor Q5 forms a stable voltage supply for the sensitive input stages of the amplifier.

It is preferred that a respective amplifier for each of acoustic sensors 46-50 be located near the associated transducers. Accordingly, cover plates 33, 35, 37, 39, and 41 provided on the sensor bar assembly of FIG. 2 are removable to reveal recesses into which the amplifiers associated with acoustic sensors 48, 47, 49, 46, and 50, respectively, may be located. The high voltage pulse generator circuit of FIG. 8 is also preferably located near the target of FIG. 2.

Additional electronic processing and controlling circuits, and a programmed general-purpose digital computer with peripheral units also form a part of the embodiment of the invention described herein. Such circuits are preferably located, along with the computer and peripheral units, in the vicinity of a "firing point" from which bullets are to be fired at the target. The circuits located near the computer perform the following functions:

(a) Amplification, filtering, and detection of signals from the "position measuring" transducers;

(b) Control and initiation of the acoustic pulses for the velocity of sound measurement; and (c) Amplification, filtering, and detection of the signals from the velocity of sound sensors.

Circuits for performing these functions are described below with reference to FIGS. 10-16.

Figure 10:
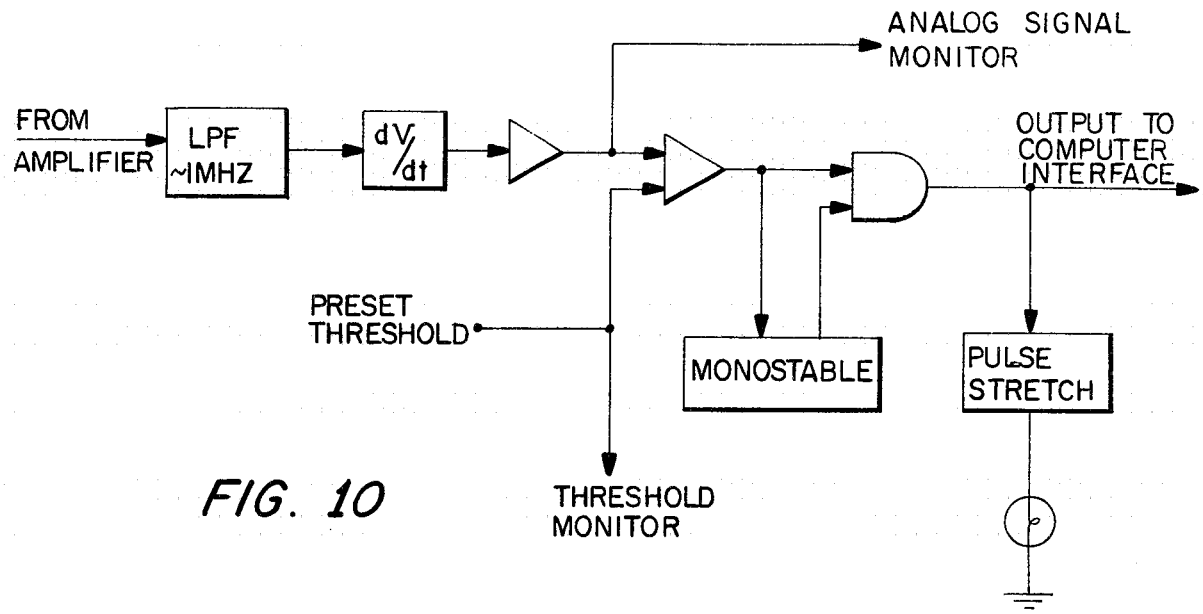
FIG. 10 shows in block schematic form one of three "position measuring" signal channels.
Figure 12:
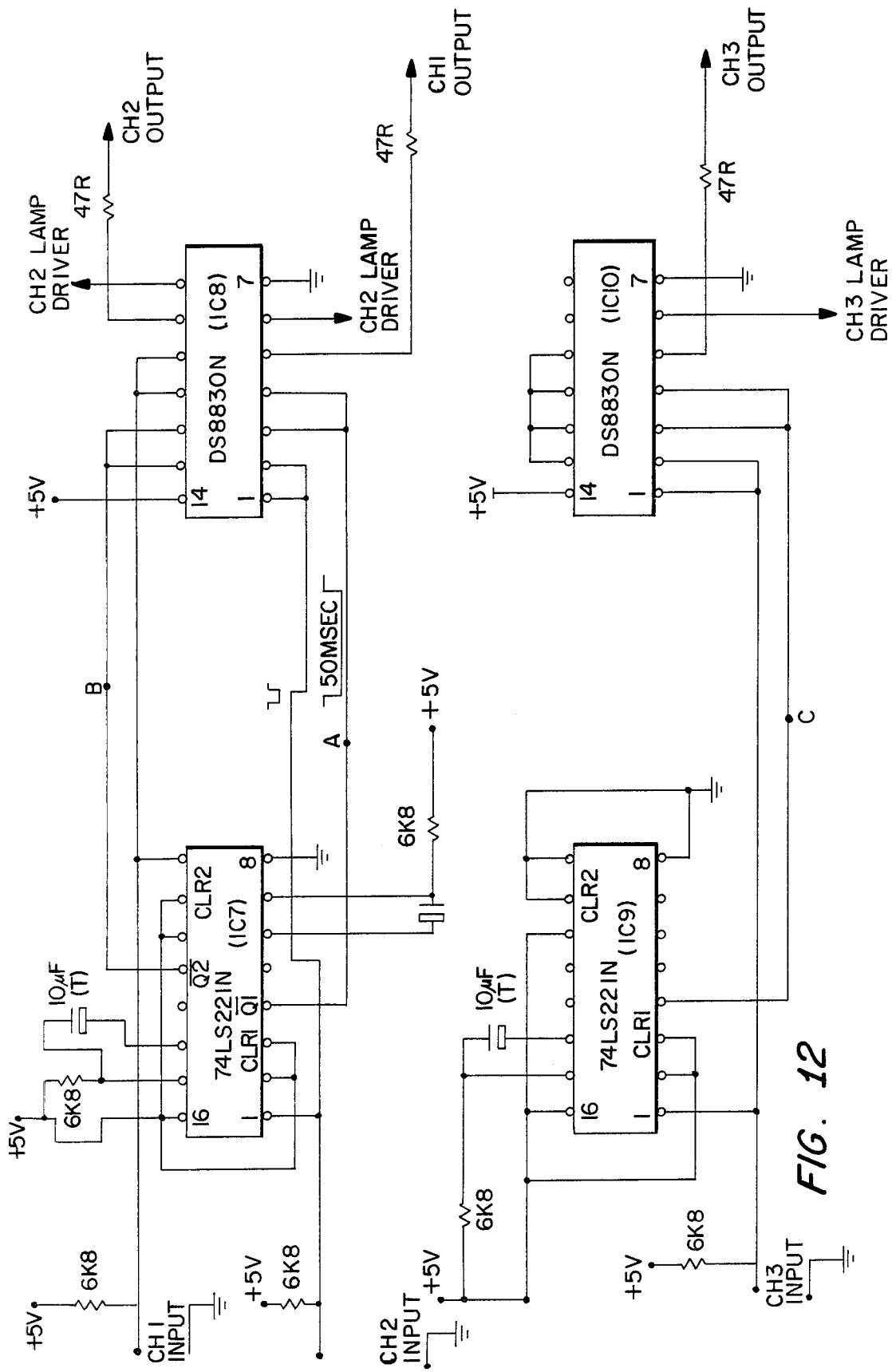
FIG. 12 shows a logic circuit arrangement for processing signals from three channel threshold detectors.

FIG. 10 shows in block schematic form one of three functionally-identical channels, each channel coupled to a respective one of "position measuring" sensor 48-50 for processing signals from these sensors. FIGS. 11-13 show more detailed circuit arrangements for the circuit blocks shown in FIG. 10. The description of the "position measuring" sensor signal processing proceeds with reference to all of FIGS. 10-13. It will be understood that proprietary sources for semi-conductive devices described herein and not otherwise identified may be taken to be Texas Instruments Ltd., Manton Lane, Bedford, U.K., for all logic devices with number identifications commencing 74 . . . ; and National Semi-Conductors Ltd., Bedford, U.K., for all devices commencing LM . . . , as well as device type J 110.

An incoming signal from a sensor amplifier (FIG. 9) is first passed through low pass filter to remove very high frequencies and noise "glitches." The signal then passes through a frequency shaping network formed by integrated circuit IC1 (FIG. 11) and the components Rf and Cf, which serve to enhance higher frequency components of the signal (principally those resulting from shock waves detected by the sensor) and suppress lower frequency components such as those caused by mechanical movement of the sensor system.

When a shock wave impinges on a transducer (i.e., sensor 49 of FIG. 2) the resulting voltage excursions at the output of IC1 (FIG. 11) comprise an initial very fast rise-time negative-going pulse. This pulse is coupled to one input of a threshold detector formed by IC2 (FIG. 11), the other input of which is provided with a preset negative threshold voltage. When the negative-going pulse exceeds the threshold voltage (typically set al-0.2 volts), the output of IC2 (FIG. 11) abruptly falls from a high voltage, typically +4 volts, to a low voltage, typically 0.5 volts. This negative-going transition triggers one half of the dual monostable multivibrator formed by IC7 (FIG. 12), causing its output (IC7, pin 4) to generate a negative-going pulse of approximately 50 milliseconds duration. This pulse is buffered by one half of buffer line driver IC8 (FIG. 12) and fed to the appropriate output terminals. By way of example, the channel 1 output of FIG. 12 may represent detection of a shock wave by sensor 49 of FIG. 2, while the channel 2 and 3 outputs of FIG. 12 may represent, respectively, detection of a shock or pressure wave at sensors 48, 50 of FIG. 2.

A second output from IC8 (FIG. 12) available on pin 6 couples to a pulse stretching driver circuit (FIG. 13) which causes a lamp indication visible to the operator to be illuminated. A corresponding lamp is provided for each channel, so that the operator can readily determine that each of the "position measuring" sensors has detected a shock or pressure wave following a bullet being fired at the target. All three "position measuring" signal processing channels are electrically identical, the only variation being that channels 1 and 2 employ the two halves of IC7 and IC8 (FIG. 12) while channel 3 uses one half of IC9 and IC10 (FIG. 12). The circuit formed by IC1 and IC2 (FIG. 11) is provided once for each channel, with the exception of the threshold reference voltage regulator circuit outlined in dashed lines in FIG. 11 and comprising diode BZY88/C5V6 and the associated resistors which feed the threshold detectors of all three channels.

Suitable circuitry for "speed of sound" measurement control and sequencing logic will now be described with reference to FIGS. 14 and 15. This sub-system receives an initiation signal from the output of the signal processing channel associated with "position measuring" sensor 49. In response, it generates the necessary drive signal for the high voltage pulse generator circuit of FIG. 8 and converts the resulting logic transitions from the two "speed of sound" sensor signal processing channels into a suitable signal for driving the "speed of sound" ("S.S.") input of the computer timer interface unit described below. Detailed circuit operation is as follows:

The output of the threshold detector of the signal processing channel associated with the center "position measuring" sensor 49 is connected to the "clock" input of one half of a dual bistable multivibrator (IC3, pin 11). Initially, the preset input of this device is at a logic high level and the Q output thereof is also at a logic high state. When center "position measuring" sensor 49 detects an acoustic pulse, it causes its associated threshold detector output to go from logic high to logic low stage. Some time later, the threshold detector will switch back to logic high. This positive-going transition causes the Q output of IC3, pin 9, to go low; this is in turn fed to and triggers the first half of a dual monostable multivibrator formed by IC1 (FIG. 14) and its associated timing components. This produces a positive -going pulse lasting approximately 0.5 seconds at pin 13 of IC1 (FIG. 14). The trailing edge of this pulse triggers the second half of IC1 (FIG. 14), which in turn generates a negative-going pulse at IC1, pin 12, of about 25 milliseconds duration. This negative-going pulse is fed through one of the four dual-input NAND gates comprising IC4 (FIG. 14), the output of this NAND gate on pin 8 of IC4 being fed to a transistor switch Q2. The output of transistor switch Q2 at its collector terminal forms the control signals for the high voltage pulse generator and is labeled "to spark control."

Returning to IC1 (FIG. 14), a logically-inverted form of the 25 millisecond pulse is also generated at IC1, pin 5. The trailing edge of this pulse is connected to the first half of the dual monostable multivibrator of IC2, causing its output on IC2, pin 13, to generate a positive-going pulse of about 0.4 millisecond duration. The trailing edge of this positive-going pulse triggers the second half of IC2, generating a negative-going pulse of about 50 millisecond duration at IC2, pin 12 (FIG. 14). This pulse is buffered by another of the four NAND gates of IC4 (FIG. 14) and appears as a positive-going pulse at IC4, pin 6.

The positive-going pulse at IC4, pin 6 (FIG. 14) performs two functions:

First, it is coupled to the "strobe" input of the threshold detector associated with the two "speed of sound" sensor signal processing channels (FIG. 15). While this pulse is active, i.e., in its logical high state, the comparators are enabled to respond to signals presented at their inputs. At all other times the comparators are disabled, thereby preventing spurious triggering of the measurement channel principally as a result of the speed of sound sensors responding to the disturbances created by projectiles fired through the target. This positive-going pulse is also coupled to the "preset" input of one half of the dual "D-type" bistable multivibrator of IC3 (FIG. 14). While this signal was low, it had forced the Q output of this device to the logical high state. Once the preset input goes high, it effectively enables the bistable multivibrator, allowing it to respond to its other input signals.

In operation, the next event that occurs is that the threshold detector output associated with the "speed of sound" measuring sensor nearest to the acoustic pulse source switches from logic low to logic high as a result of this sensor detecting the acoustic pulse. This signal appears in an inverted form at IC4, pin 3, (FIG. 14), where it then connects to the "clear" input of the first bistable multivibrator (IC3, pin 1). As a result, the Q1 output of IC3 goes low. Some time later the acoustic pulse arrives at the further "speed of sound" sensor 47, causing the second comparator output to switch from logic low to logic high. This positive-going transition is fed to the "clock" input of the bistable multivibrator (IC3, pin 3) causing the Q output to return to its logic high state. This Q output is fed to the "speed of sound" ("S.S.") input of the computer timer interface unit described later below and, as the preceding description indicates, this will consist of a single negative-going pulse having a duration determined by the time delay between the acoustic pulse reaching the respective "speed of sound" sensors 46, 47. The timer interface unit measures the length of this pulse and, as described below, the computer makes use of this measurement to calculate the effective propagation velocity of sound within the target chamber.

Figure 16:
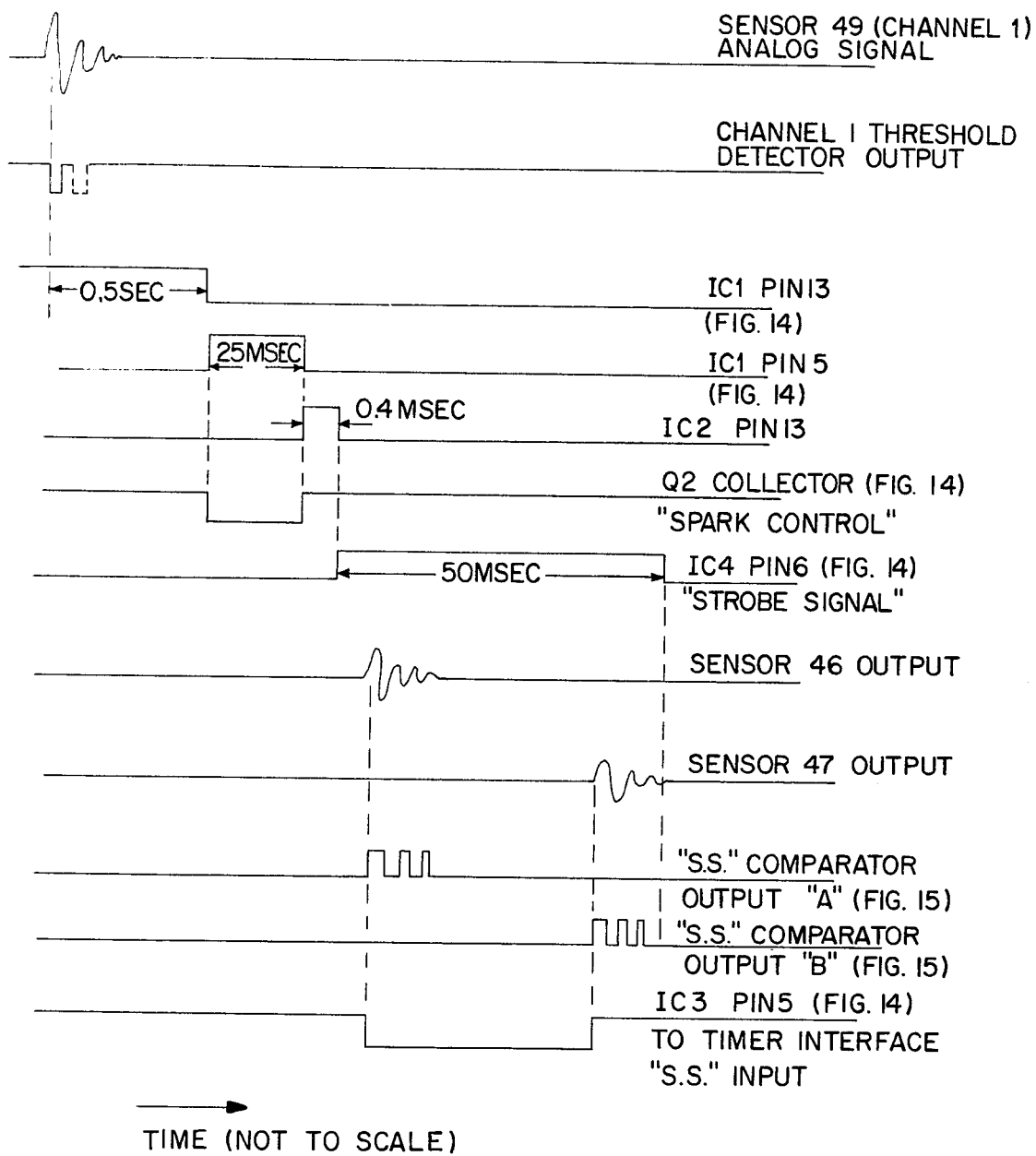
FIG. 16 shows a timing diagram for the circuitry of FIGS. 14-15.

FIG. 15 shows a preferred circuit arrangement for the "speed of sound" sensor amplifiers and for the "speed of sound" sensor threshold detectors. A detailed amplifier circuit for one of the "speed of sound" sensors is shown in dashed lines in FIG. 15. It will be understood that amplifier "A" of FIG. 15 may be identical to amplifier "B." Following amplification of the signals from "speed of sound" sensors 46, 47, the signals are applied to one half each of a dual comparator. The two outputs of this device are then fed to the logic circuits already described with reference to FIG. 14. Operation of one "speed of sound" comparator circuit is as follows:

The incoming signal is fed to the inverting input of a threshold detector, while the non-inverting input is connected to a preset negative fixed voltage derived from a resistor bias chain and voltage regulator diode. The comparator also has "strobe" input which is normally held in a logical low state, thereby disabling the comparator. When the "strobe" signal goes high, the comparator is enabled and its output is then at a logic low level. When the associated sensor signal, which will comprise a fast negative-going pulse, exceeds the preset voltage on the comparator's non-inverting input, the output will switch abruptly to the logic high state. Operation of the second half of this comparator unit is functionally and electrically identical. FIG. 16 shows a timing diagram (not to scale) for the "speed of sound" measurement circuitry, which illustrates the operation of the circuits of FIGS. 14 and 15.

Figure 17:
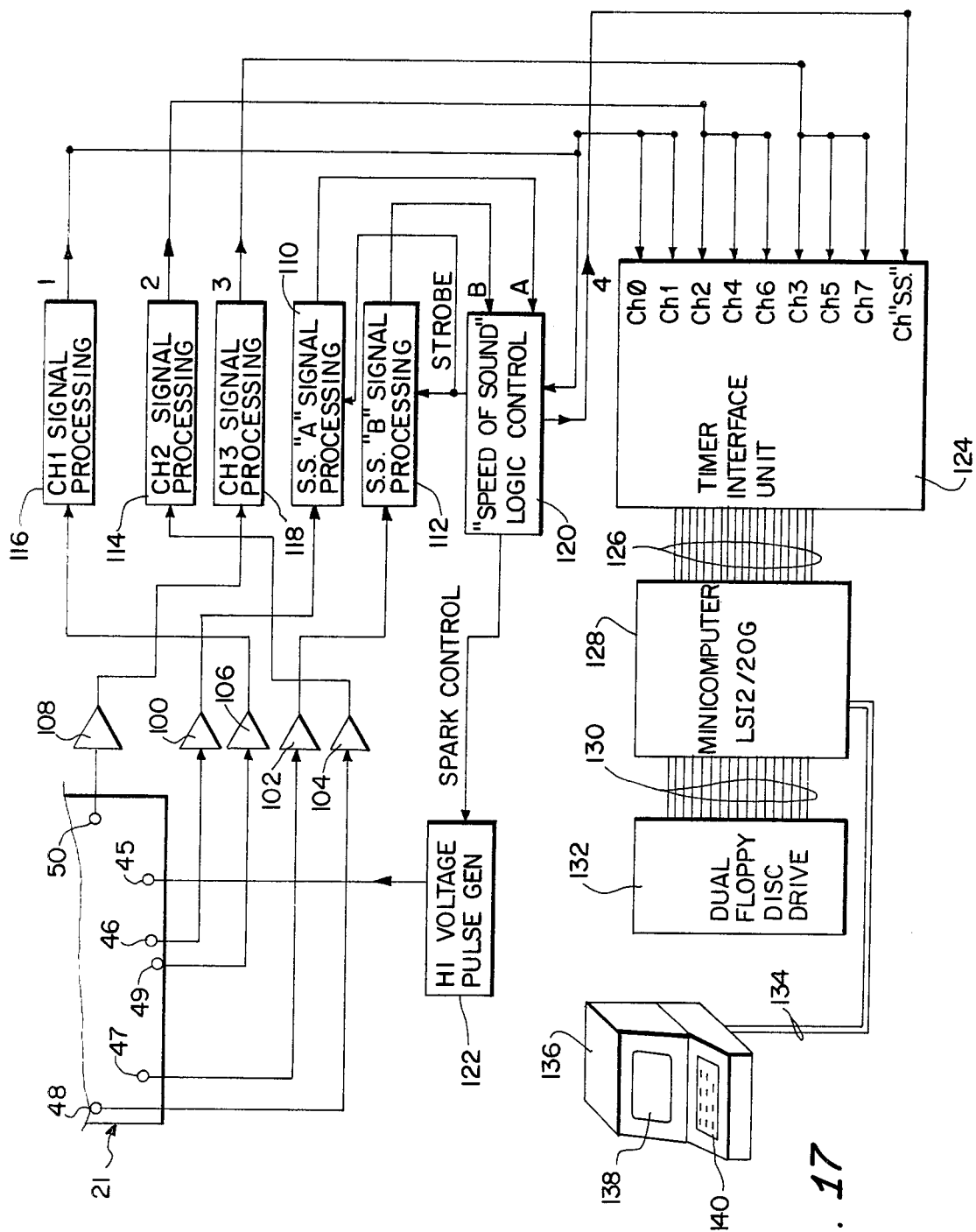
FIG. 17 shows an overall block schematic diagram of the target system in accordance with the invention.

FIG. 17 shows an overall block schematic diagram of the system. The lower portion of target 21 containing spark gap assembly 45, "speed of sound" sensors 46, 47, and "position measuring" sensors 48-50 is illustrated schematically. Sensors 46 and 47 are connected to the respective inputs of amplifiers 100, 102. Each of amplifiers 100, 102 may comprise a circuit as outlined in dashed lines in FIG. 9. Sensors 48-50 are coupled to the respective inputs of amplifiers 104, 106, and 108, these amplifiers preferably also taking the form of the circuit shown in FIG. 9. The outputs of amplifiers 100, 102 are coupled to the respective inputs of signal processing circuits 110, 112. The "speed of sound" signal processing circuits 110, 112 may be as shown in FIG. 15. The outputs of amplifiers 104, 106, 108, are coupled to respective inputs of signal processing circuits 114, 116, 118. Each of circuits 114, 116, 118 has a threshold detector circuit as shown in FIG. 11, which couples to logic circuitry. Suitable logic circuitry for the latter portion of blocks 114, 116, 118, is shown in FIG. 12.

Figure 14:
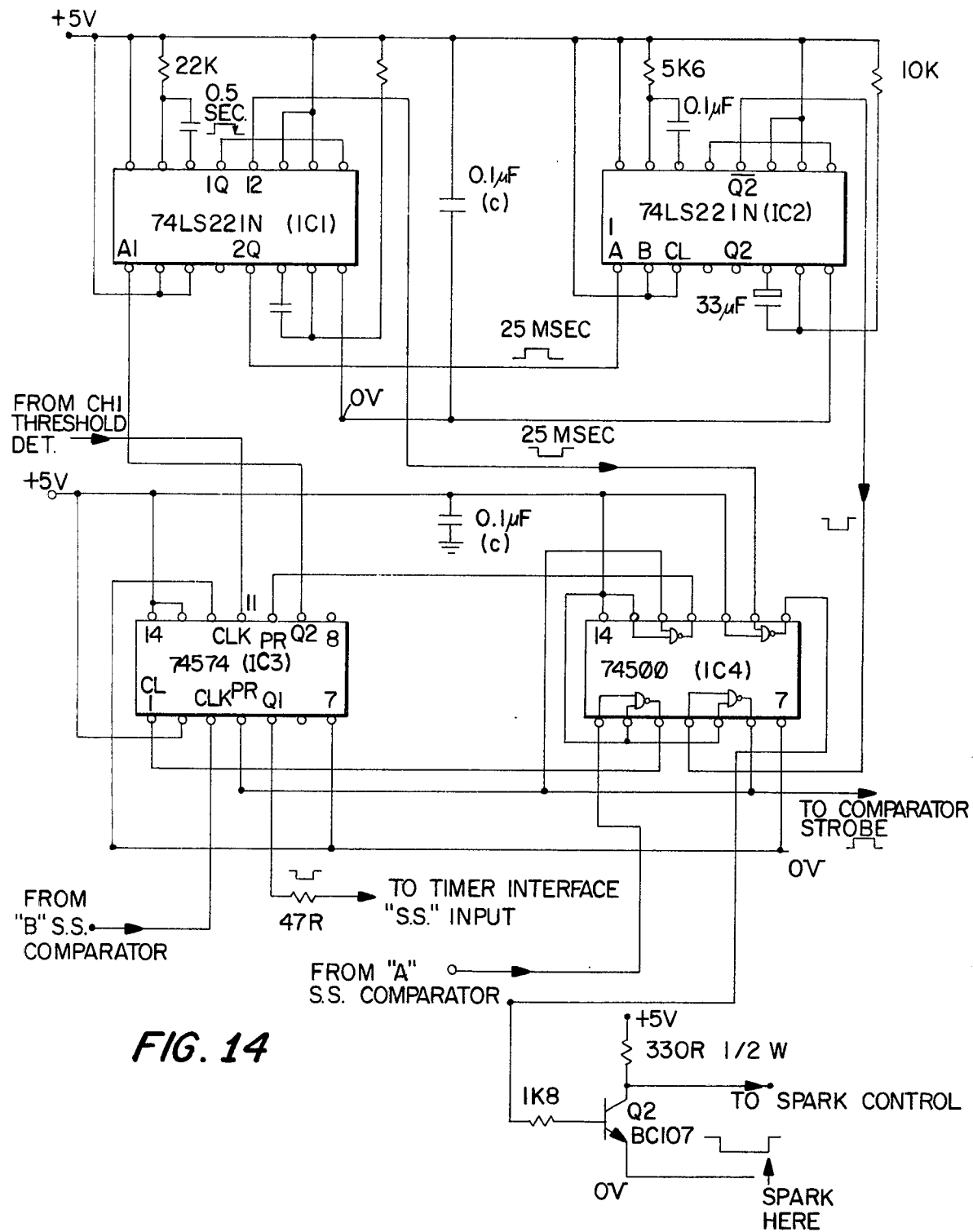

The outputs of signal processing circuits 110, 112 are provided to a "speed of sound" logic control circuit 120, which may be as shown in FIG. 14. Logic control circuit 120 provides a "strobe" signal to the comparators of "speed of sound" signal processing blocks 110, 112 (i.e., as in FIG. 15) and also provides a spark control signal to a high voltage pulse generating circuit 122, which may be as shown in FIG. 8. The output of the high voltage pulse generating circuit 122 is in turn coupled to spark gap assembly 45, which may as shown in FIG. 7.

The output of channel 1 signals processing circuit 116 is provided to logic control block 120 (see FIG. 14), as well as to channels Ch0 and Ch1 of a timer interface unit 124, to be described further below. The output of signal processing block 114 is supplied to channels Ch2, Ch4, and Ch6 of timer interface unit 124, while the output of signal processing block 118 is provided to channels Ch3, Ch5, and Ch7 of timer interface unit 124. A further output of logic control block 120 is coupled to the channel Ch "S.S." input of timer interface unit 124.

Timer interface unit 124 is coupled by buses 126 to a minicomputer 128. Minicomputer 128 is also connected by buses 130 to a dual floppy disk drive 132 and by buses 134 to a computer terminal 136 having a display screen 138 and keyboard 140. The minicomputer may be of type LSI 2/20G, available from Computer Automation Inc., Naked Mini Division, 18651 Von Karmen, Irvine, California 92713, U.S.A., Part No. 10560-16. A floppy disk drive 132 which is plug-compatible with the LSI 2/20G minicomputer is available from Computer Automation Inc., Part No. 22566-22, as is a floppy disk controller, Part No. 14696-01. A suitable computer terminal 136 is Model MRD 520, available from Applied Digital Data Systems, Inc., 100 Marcus Blvd., Hauppauge, New York 11787, U.S.A. The model MRD 520 computer terminal is also plug-compatible with the LSI/20G minicomputer. The buses 226, 130 are termed "Maxibus" by Computer Automation, Inc.

Figure 18A:
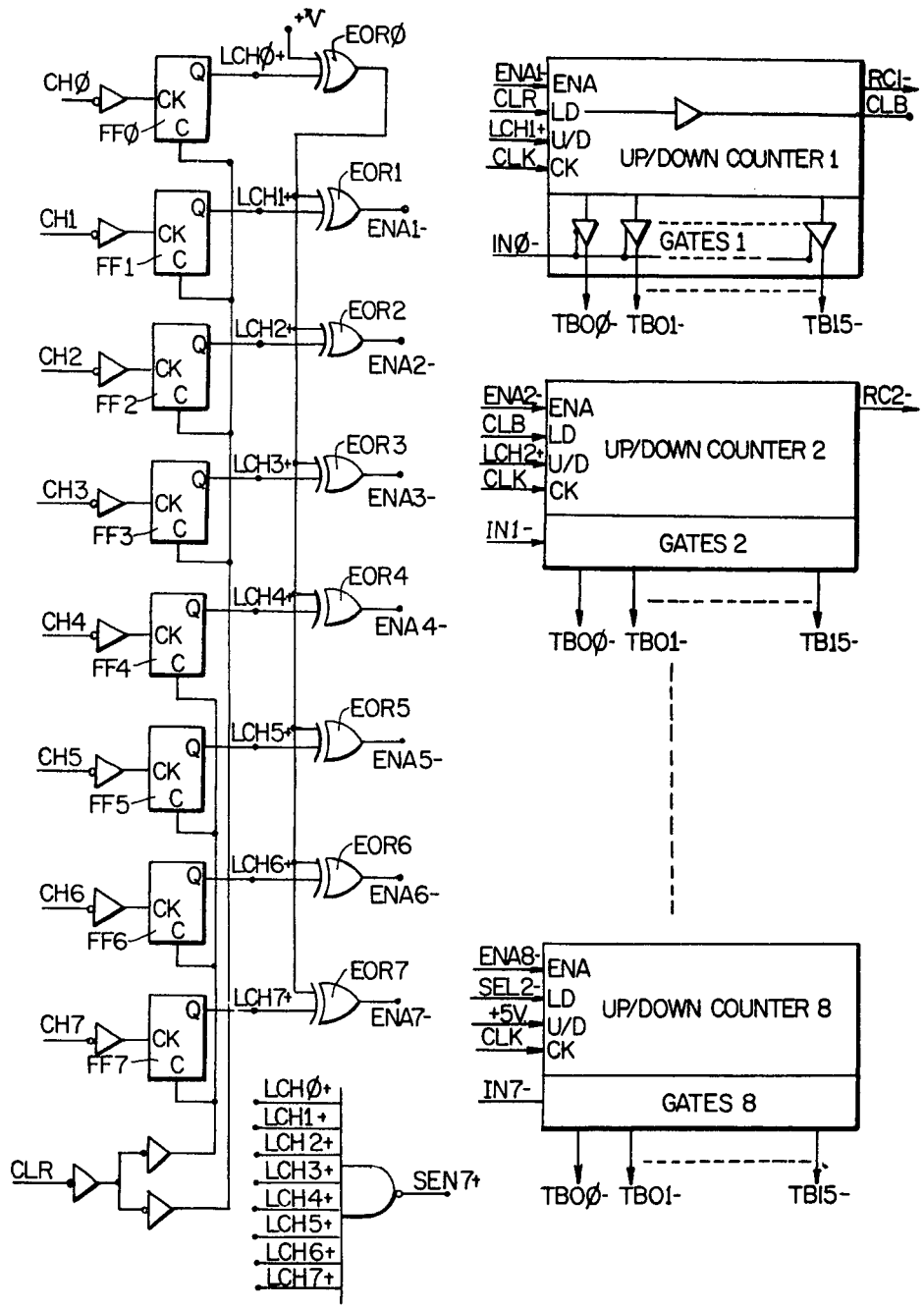

Before describing the overall system operation with reference to FIG. 17, attention is directed to FIGS. 18A–18H, which show a preferred arrangement for the timer interface unit 124, which converts time differences between the fast logic-edge pulses initiated by the sensors into binary numbers suitable for processing by minicomputer 128. FIG. 18A shows the input and counting circuit portion of the timer interface unit, which accepts timing edges from circuit blocks 110–118 of FIG. 17 and generates time difference counts in respective counters. The timer interface unit has eight so-called "channel" inputs labeled Ch0–Ch7 and one input labeled "S.S.", receiving signals as follows:

| Timer Interface Input Channel No. | Receives Signals initiating from |
|---|---|
| φ | Sensor 49 |
| 1 | Sensor 49 |
| 2 | Sensor 48 |
| 3 | Sensor 50 |
| 4 | Sensor 48 |
| 5 | Sensor 50 |
| 6 | Sensor 48 |
| 7 | Sensor 50 |
| S.S. | Sensors 46, 47 |

The input signals to each of timer interface inputs Ch0-Ch7 comprise logic signals which are first buffered and then supplied to the clock input Ck of respective latches FF0–FF7. The latch outputs LCH0 through LCH7+ are provided, as shown, to exclusive OR gates EOR1-EOR7, which in turn provide counter enabling signals ENA1– through ENA7–. Latches FF0-FF9 are cleared upon receipt of clear signal CLR. The input and counting circuits also include a respective up/down counter for each of eight channels (indicated for channel 1 as "UP/DOWN COUNTER 1"). Each up/down counter comprises, for example, four series-connected integrated circuits of type 74191. Each of up/down counters 1-8 thus has 16 binary outputs, each output coupled to a respective one of terminal TB00– through TB15– via a controllable gate circuit (indicated for channel 1 as "GATES1") on receipt of a command signal (indicated for channel as "IN0–"). Up/down counter 1 is connected to receive latch signal LCH, enable signal ENA1–, a clock signal CLK, and a clear signal CLR, and to provide a ripple carry output signal RC1– when an overflow occurs. Up/down counters 2-8 each receive a respective one of enable signals ENA2– through ENA8–. Counter 2 receives its clear signal CLB from counter 1; counters 3 and 5 receive clear signal CLR and provide clear signals CLB to counters 4 and 6, respectively; counter 7 receives clear signal CLR; and counter 8 receives clear signal SEL2–. The up/down inputs of counters 2-7 receive latch signals LCH2+ through LCH7+, respectively, while the up/down input of counter 8 is permanently connected to a +5 volt source. Counters 2-8 each receive clock signal CLK, while each of counters 2-7 provide a ripple carry signal (RC2– through RC7–, respectively) when the respective counter overflows. Gates 2-8 are coupled to receive respective command signals IN1– through IN7– for passing the counter contents to terminals TB00– through TB15–. FIG. 18A also shows a gate NAND 1 which receives the latch outputs LCH0+ through LCH7+ and provides an output signal SEN7+, the purpose of which is explained below.

Figure 18B:
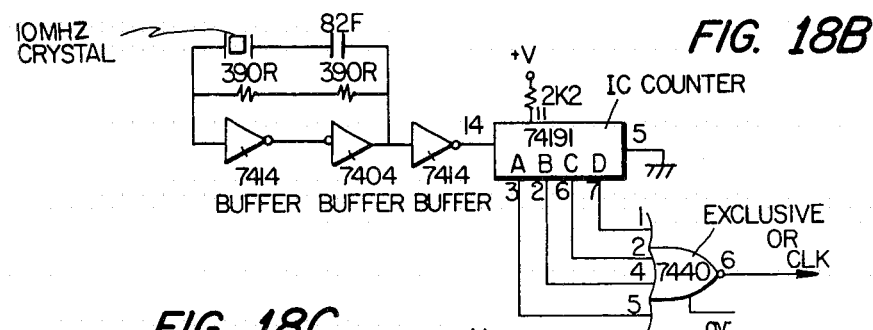

FIG. 18B shows a circuit for providing clock signal CLK for up/down counters 1-8. The clock frequency is, for example, about 5 MHz for the indicated components.

Figure 18C:
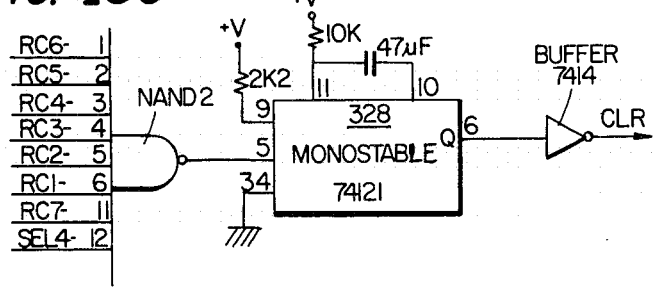

FIG. 18C shows a circuit for providing clear signal CLR, which resets input latches FF0–FF7 and up/down counters 1-7. When one of ripple carry outputs RC1– through RC7– of up/down counters 1-7 goes to a logic low level, indicating that a counter has overflowed, or when a reset signal SEL4– is provided from the computer, gate NAND 2 triggers a monostable element which then provides clear signal CLR in the form of a logic pulse to clear up/down counters 1-7 and input latches FF0–FF7 of FIG. 18A.

Up/down counters 1-7 are reset by signal SEL4– from the computer before a shot is fired at the target. When a shot is fired, each counter will count down or up depending on whether its associated channel triggers before or after a reference channel, which in this case is input channel Ch0.

Figure 18D:
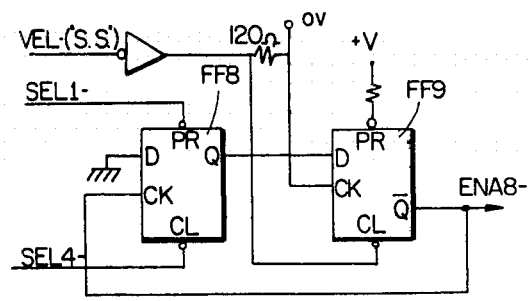

FIG. 18D shows the input circuitry for input "S.S." of the timer interface. Latch FF8 is coupled to receive reset signal SEL4– and preset signal SEL1– from the interface controller of FIGS. 18F and 18G in response to computer commands. Timer interface input "S.S." receives "speed of sound" signal VEL– from logic control block 120 of FIG. 17, and provides a counter enable signal ENA8— for up/down counter 8.

Figure 18G:
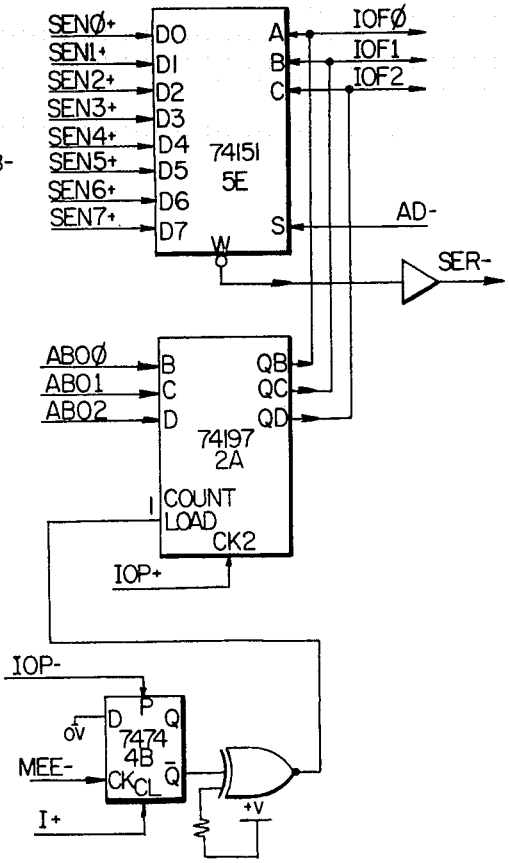

The computer communicates with the timer interface unit by placing a "device address" on lines ABO3-ABO7 (FIG. 18E) and a "function code" on lines ABO0 —ABO2 (FIG. 18G). If the computer is outputting data to the timer interface, signal OUT is produced; if the computer is inputting data, signal IN is produced.

FIG. 18E shows the connection of exclusive OR gates EOR11-EOR15 for decoding the "device address". A "device address" can also be selected manually by means of switches SW1-SW5. Address signal AD— from gate NAND3 is further gated as indicated with computer-initiated signals IN, OUT, EXEC, and PLSE, to prevent the timer interface from responding to memory addresses which also appear on the address bus.

FIG. 18G shows a latch 2A which "holds" the function code on lines ABO$\phi$—ABO2 when either the IN or OUT signal is produced. The input/output function signals from latch 2A are labeled IOF0 through IOF2.

If the computer executes an IN instruction to receive data from the timer interface, the combination of IOF0 through IOF2 and ADIN— (FIG. 18E) produce one of signals IN0 — through IN7— at BCD/decimal decoder 5A of FIG. 18F. Each of signals IN0 — through IN7— enables data from one of up/down counters 1-8 to be placed on data bus terminals TBO0 -through TB15—.

If the computer is executing a "select" instruction for the timer interface, the combination of signals IOF0 —IOF2 and ADEXP— (FIG. 18E) produce one of select signals SEL0 — through SEL7— at BCD/decimal decoder 5B of FIG. 18F. The select signal functions employed in the presently-described invention are:

SEL1— enables triggering of latch FF9 (FIG. 18D)
SEL2— resets up/down counter 8 (FIG. 18A)
SEL4— resets latch FF8 (FIG. 18D) and triggers monostable element 328 via NAND2 (FIG. 18C)

If the computer is executing a "sense" instruction from the timer interface unit, the combination of signals IOF0 —IOF2 (FIG. 18G) and AD— (FIG. 18E) allow one of sense signals SEN0 + through SEN7+ to be placed on the SER— line (FIG. 18G). This allows the computer to examine the state of one of these sense signals. The only sense signal employed in the presently-described embodiment is SEN7+; SEN7+ indicates when the timer interface unit has a complete set of time data for a single shot fired at the target.

Figure 18H:
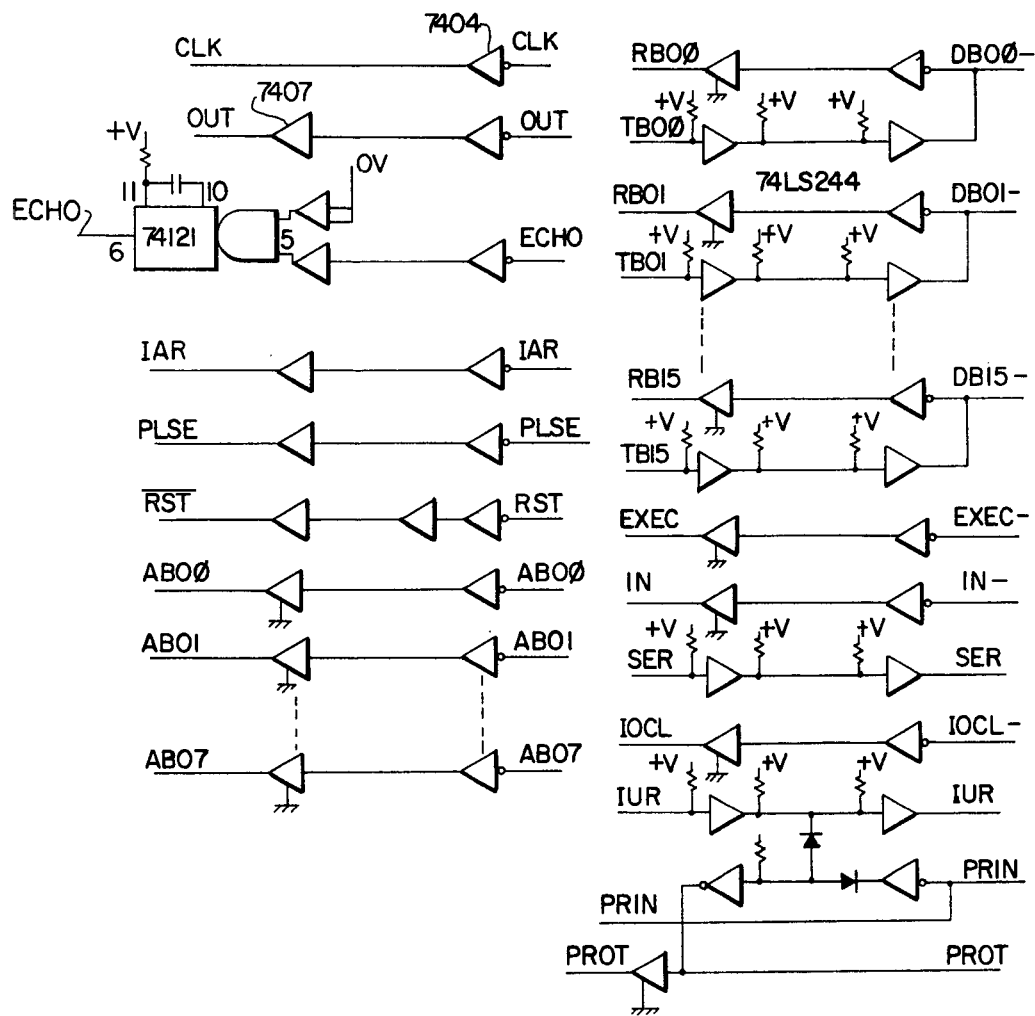

FIG. 18H shows buffer connections between the timer interface subsections of FIGS. 18A-18G and the minicomputer buses.

The theory of operation of timer interface unit 124 of FIGS. 18A-18H is as follows. Channel Ch0 is the reference channel. Each channel triggering will clock a respective one of latches FF0 —FF7, producing a respective one of signals LCH0 + through LCH7+. Signals LCH1+ through LCH7+ each control the up/down line of one of counters 1-7 and are also provided to OR gates EOR1 through EOR7 to produce a respective counter enabling signals ENA1— through ENA7—. Exclusive OR gates EOR1 through EOR7 each achieve two functions. First, the counters of any of channels Ch1-Ch7 that trigger before reference channel Ch0 will be enabled until reference channel Ch0 triggers. This has the effect of causing the associated counters to count down because the associated LCH+ input line is high. Second, the counters of any of channels Ch1-Ch7 that have not triggered by the time reference channel Ch0 triggers are all enabled by the reference channel until each individual channel triggers. This has the effect of causing the associated counters to count up, since the associated LCH+ lines are low while the counters are enabled.

Initially, the computer resets up/down counter 8 with signal SEL2— and then causes a general reset with signal SEL4—. Signal SEL4— causes gate NAND2 (FIG. 18C) to trigger monostable element 328, producing clear signals CLR, which resets latches FF0 -FF7 and up/down counters 1-7 (FIG. 18A). Reset signal SEL4— also clears latch FF8 (FIG. 18D). Latch FF9 (FIG. 18D) is preset by the computer with signal SEL 1—, which puts set steering onto FF9. Latch FF9 is thus clocked set when a signal VEL— is received at the "S.S." input from logic control block 120.

Thus, prior to a shot being fired, counters 1-8 are reset, input latches FF0 -FF7 are reset, and latch FF9 is "armed." All resets occur when the computer executes controller BASIC statement CALL (3), described further below.

At this stage, none of channels Ch0 through Ch7 or the "S.S." channel 8 has been triggered. Since channel Ch0 has not yet triggered, signals LCH0 + is low. The remaining input of gate EOR0 is permanently high, so the output of gate EOR0 is high. Since signals LCH1+ though LCH7+ are all low, signals ENA1— through ENA7— are all high, disabling all of up/down counters 1-7. Signal ENA8— is also high, disabling up/down counter 8.

Assume now that a shot is fired far to the left of center of the bull's-eye shown on the target in FIG. 2. Channels 2, 4, 6 of FIG. 18A trigger first, so that signals LCH2+, LCH4+, LCH6+ go high, causing signals ENA2—, ENA4—, ENA6— to go low and thereby causing up/down counters 2, 4, 6 to begin counting down. Reference channel Ch0 and Ch1 then trigger simultaneously. Signal LCH0 + goes high, so the output of gate EOR0 goes low. This makes signals ENA2—, ENA4—, ENA6— go high, while signals ENA3—, ENA5—, ENA7— go low. Signals ENA1— and ENA8— remain high. Counters 2, 4, 6 will thus stop counting, counter 1 remains disabled and has no count, and counters 3, 5, 7 will start counting up.

As each successive channel triggers, its respective LCH+ signal will go high, removing the associated ENA— signal and stopping the associated counter. When all LCH+ signals are high (indicating that all counters have been disabled), signal SEN7+ at the output of gate NAND1 in FIG. 18A goes from high to low. The computer monitors signal SEN7+ to wait for all timing edge counts to be completed.

A "speed of sound" measurement is initiated by logic control block 120 (FIG. 17) when the output of signal processing block 116 (FIG. 17) indicates that sensor 49 has detected a pressure wave. After a delay of about one half second, logic control block 120 initiates a spark discharge from spark gap assembly 45. The resulting negative-going pulse from IC3 pin 5 (FIG. 14) is supplied to the "S.S." input of timer interface unit 124 (FIGS. 17 and 18D). The leading edge of this pulse causes signal ENA8— to enable counter 8 (FIG. 18A), while the trailing edge of this pulse disables counter 8. Counter 8 thus contains a count representing the time of travel of the spark-induced acoustic pulse from sensor 46 to sensor 47.

When the computer is advised by signal SEN7+ that a complete set of counts is present in counters 1 through 7, the computer issues signals which cause BCD-to-decimal decoder 5B (FIG. 18F) to issue signals IN0 — through IN7— in sequence so that the computer will sequentially "read" the state of each of counters 1-8 (on output lines TBO0 -through TB15—) via the buffers of FIG. 18H.

The computer is programmed to operate on the received "time" signals in a manner which will be described below, to determine the origin of the detected shock or pressure wave and, hence, the location at which a bullet fired at the target has penetrated the target.

If any channel of the timer interface unit triggers spuriously, the associated counter will continue counting until it overflows, causing a ripple carry signal (RC1—through RC7—). All of the ripple carry signals are supplied to gate NAND2 (FIG. 18C), which fires the associated monostable element 328, causing generation of clear signal CLR which resets latches FF0 –FF7 and up/down counters 1-7.

The address, data, and timing buses in the LSI-2/20G minicomputer are entitled "Maxibus" by the manfuacturer. Definitions of the Maxibus signals indicated at the right-hand side of FIG. 18H may be found in chapter 8 of the "LSI-2 Series Minicomputer Handbook," Part No. 20400-0080, Apr. 1976, published by Computer Automation, Inc. All signals to and from the Maxibus are buffered between the minicomputer and timer interface unit 124, by the buffering circuits shown in FIG. 18H. Signals DBO0 —, BDO1—, and DBO2— are bidirectional on the Maxibus and are converted to two unidirectional signals each in the buffering circuits of FIG. 18H. Signals "OUT" and "IN" both refer to the minicomputer.

The Maxibus signal designations are related as follows to the Maxibus pin members:

| MAXIBUS SIGNAL | MAXIBUS PIN NUMBER |
|---|---|
| o volt | 1 |
| o volt | 2 |
| +5 volts | 13 |
| +5 volts | 14 |
| DBO$\phi$- | 39 |
| DBO1- | 40 |
| DBO2- | 41 |
| DBO3- | 42 |
| DBO4- | 45 |
| DBO5- | 46 |
| DBO6- | 47 |
| DBO7- | 48 |
| DBO8- | 49 |
| DBO9- | 50 |
| DB10- | 51 |
| DB11- | 52 |
| DB12- | 53 |
| DB13- | 54 |
| DB14- | 55 |
| DB15- | 56 |
| EXEC- | 57 |
| IN- | 58 |
| IOCL | 61 |
| OUT- | 62 |
| CLK | 63 |
| SER- | 64 |
| IUR- | 65 |
| IAR- | 67 |
| RST- | 69 |
| PLS- | 71 |
| ECHO- | 72 |
| ABO3- | 75 |
| ABO4- | 76 |
| ABO5- | 77 |
| ABO6- | 78 |
| ABO7- | 79 |

-continued

| MAXIBUS SIGNAL | MAXIBUS PIN NUMBER |
|---|---|
| ABO$\phi$- | 80 |
| ABO1- | 81 |
| ABO2- | 82 |
| PRIN- | 83 |
| PROT- | 84 |

DESCRIPTION OF OPERATION OF SYSTEM

After setting up and initializing the computer system as described in the literature provided by the manufacturer (and loading the programs, described further below) the screen 138 of computer terminal 136 will indicate that the system is ready to receive a shot, by displaying the message "FIRE SHOT NO. 1." When the projectile is fired at the target, it passes through the front membrane 24 of the target (FIG. 2) and causes a radially-expanding air pressure wave disturbance to be set up in the air space between the front and rear membranes, centered on the point of penetration of the projectile. As this pressure wave expands, it impinges in due course on the three "position measuring" sensors 48—50. As each sensor is struck by the pressure wave, it produces an electrical response which is amplified by the adjacent amplifiers and transferred down the connecting cables to the signal processing units 110–118 (FIG. 17). The wave form is here converted to a logic transition and fed into the timer interface unit 124. Timer interface unit 124, is already described, contains counters which are controlled so that they count two values which represent the difference in time of arrival of the pressure wave at the "position measuring" sensors 48-50.

A "speed of sound" measurement is initiated when the output of center sensor 49 indicates that it has received the pressure wave. After a delay of approximately one half second to allow the vibrations within the target chamber set up by the projectile to decay, the "speed of sound" logic control unit 120 initiates a spark discharge within the target, thereby creating a fast rise-time acoustic pulse in the target chamber. This pulse propagates laterally across the chamber, first reaching sensor 46 and then reaching sensor 47. The resulting signals are amplified and transmitted to the signal processing units 110, 112 located near the computer, where they are converted into a single pulse having a duration equal to the difference in time of arrival of the pressure pulse at sensors 46, 47. This pulse feeds into the "speed of sound" input channel "S.S." of timer interface unit 124 and causes counter 8 of timer interface unit 124 to count to a value representing the duration of this pulse.

When all these events have occurred, the special machine code subroutine (described below) servicing timer interface unit 124 then causes the respective counter values to be transferred from timer interface unit 124 into computer 128, where they are then made available for the "BASIC" program (described below) to compute the location at which the projectile has penetrated the target membranes. The computed position is then displayed on screen 138 of computer terminal 136. Once displayed, the computer will then indicate when it is ready for another shot by a message, i.e., "FIRE, SHOT NO. X." The number X is incremented by one after each shot.

Appendix A comprises a program in "BASIC" programming language for calculation of the position at which the projectile has penetrated the target. Lines 10–690 are concerned with initialization, including subroutine lines 2500–2990, which set up the initial nominal values for the sensor positions at the stated temperature. Program execution then transfers to the subroutine starting at line 2000. Line 2080, CALL (4, Z, A2, T7, T6, T5, T4, T3, T2, T1), is a statement which, when executed, causes the data available in the timer interface unit to be collected and transferred into the "BASIC" program. Execution continues with a calculation of the effective speed of sound at line 2270.

Program execution then transfers to a subroutine at line 4000, which is a special subroutine designed to provide automatic compensation for variation with temperature of the dimensions of the sensor bar assembly carrying sensors 46–50. The essence of this technique is to convert back from the measured speed of sound value to an estimate of the air temperature. This estimate will not be precise, but will be within a few degrees Centigrade of the true value, which is adequate for practical purposes. Once the estimated air temperature is calculated, the program adjusts the nominal sensor positions on the basis of a predetermined value for the thermal expansion coefficient of the metal of which the sensor support beam is fabricated. In the preferred arrangement, the sensor support beam is constructed of aluminum, and the program therefore uses a typical expansion coefficient for aluminum of $2.1 \times 10^{-5}/°C$.

Program execution then return to line 700, where the calculation of hit position is initiated. The calculation of hit position is based on the Newton-Raphson interative technique as applied to multiple simultaneous equations. The principle of this procedure is described below.

The "BASIC" subroutines CALL (3) and CALL (4,———) employed in the program of Appendix A are Assembly Language subroutines utilized to interface timer interface unit 124 with the Controller BASIC of Appendix A. "Controller BASIC" is a version of the high-level computer language "BASIC" available from Computer Automation Inc. for use in the LSI-2 minicomputer. Controller BASIC has the facility of linking user written subroutines to BASIC for the control of non-standard input or output devices. "Assembly Language" is employed for programs which convert pseudo-English programming statements to binary instructions which can be executed on the Computer Automation LSI-2 minicomputer. The features of "BASIC" are described in sections 1–7 of Computer Automation BASIC Reference Manual No. 90-965000-01E2. Appendix A of that Manual describes linking of Assembly Language subroutines to BASIC, while Appendix E describes the component software modules incorporated in Controller BASIC. Computer Automation Assembler Reference Manual No. 90-96552-00A1 describes all features of the Computer Automation Assembly Language facility known as MACR02. Computer Automation Real Time Executive Users Manual No. 90-94500-00F2 describes all features of the real time executive program which is required for running Controller BASIC on the LSI2 minicomputer.

Two Assembly Language subroutine facilities are provided in the programming described herein. They are:

CALL (3): Execution of this BASIC statement resets timer interface unit 124 and readies the circuitry for use. This subroutine is assigned the Assembly Language label RESET.

CALL (4, Z, A2, T7, T6, T5, T4, T3, T2, T1): Execution of this BASIC statement transfers the binary numbers of counters 1–8 of timer interface unit 124 to BASIC, in sequence. This subroutine is assigned the Assembly Language Label IN:HIT in the Controller BASIC Event Handler Subroutine Module.

Figure 19:
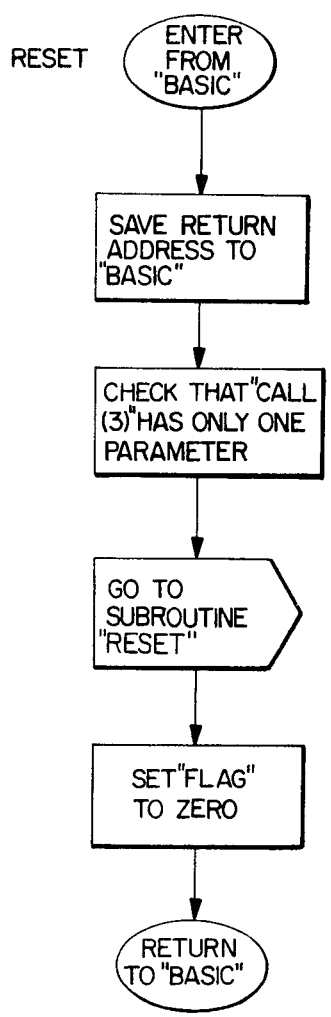
FIG. 19 shows a flow chart for computer machine code subroutines "RESET" and "RST;"
Figure 19:
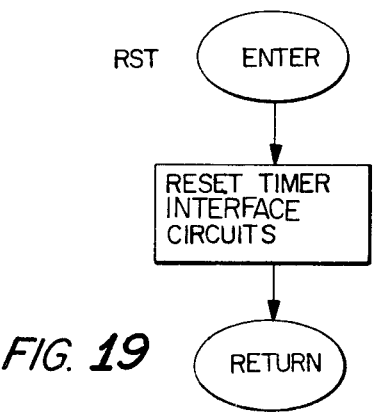

FIG. 19 shows a flow chart for the subroutine RESET. Appendix B provides a program listing for this subroutine. The subroutine RESET starts on line 103 of the listing of Appendix B. It saves the return address to BASIC and then tests that CALL (3) has only one parameter. Another subroutine labeled RST (line 94) is then called which contains the instructions to reset the timer interface unit circuits, Subroutine RESET ends by returning to BASIC.

Subroutine IN:HIT commences on line 111 of Appendix C by saving the return address to BASIC, and then checks that CALL (4, ————) has ten parameters, i.e., it verifies the format of the statement.

On line 115 of Appendix C, the program labeled HOLD checks whether the computer operator has pressed the "E" key on the LSI-2/20G minicomputer front panel. This is a feature which allows the operator to escape from the subroutine back to BASIC if the timer interface unit fails to operate for any reason. If the "E" key has been pressed, the program labeled ESCAPE (line 121) passes 8 zero values and one flag value to BASIC using the subroutine PASSV which will be described later. If the "E" key has not been pressed, the program checks whether the timer interface unit has been triggered and is ready to input data to the computer. If the timer interface unit is not ready, control passes back to HOLD and the loop is executed indefinitely until either the timer interface unit becomes ready or the operator presses the "E" key.

When the timer interface unit becomes ready, the program proceeds to PASS (line 133), which inputs data from the first seven counters of the timer interface unit in sequence and passes the data to BASIC.

The program labeled END (line 127) passes the flag value to the ninth BASIC variable and control passes back to BASIC on line 129. The flag value is not used in the presently-described embodiment of the invention.

The subroutine PASSV (line 158) is used to pass all values to BASIC. It first converts the value to floating point format and then stores the result in a 32-bit accumulator described in Appendix A of the Computer Automation, Inc., BASIC Reference Manual. The subroutines at lines 37 to 92 inclusive, lines 170 to 184 inclusive, and lines 186 to 193 inclusive in Appendix B contain facilities not used in the presently-described embodiment of the invention.

Figure 20:
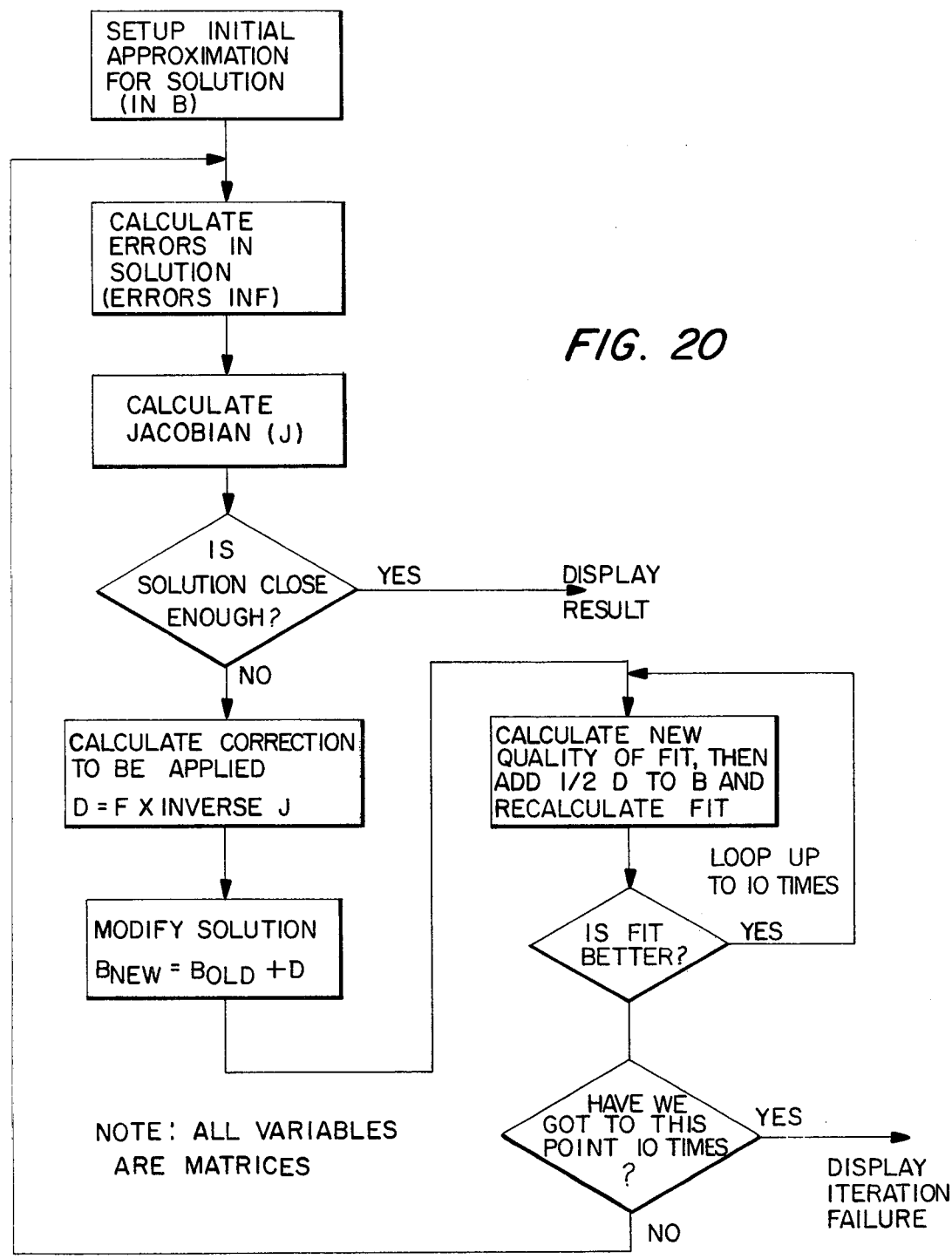
FIG. 20 is a flow chart illustrating the Newton-Raphson technique applied to solution of simultaneous equations.

The underlying principal of the Newton-Raphson technique applied to solution of simultaneous equations, as exemplified in the BASIC program listing of Appendix A, will now be explained with reference to FIGS. 20 and 21.

To find a better approximation to the solution of:

$$f1(x,y) = 0 \atop f2(x,y) = 0 \Bigg\} \text{ from starting point } (x_0, y_0) \quad (1)$$

$$(B) \nearrow$$

A change (x, y) will produce changes in the functions f1 and f2 of:

$$\Delta f1 = \frac{\partial f1}{\partial x} \Delta x + \frac{\partial f1}{\partial y} \Delta y \Biggr\} \quad (2)$$
$$\Delta f2 = \frac{\partial f2}{\partial x} \Delta x + \frac{\partial f2}{\partial y} \Delta y$$

Figure 21:
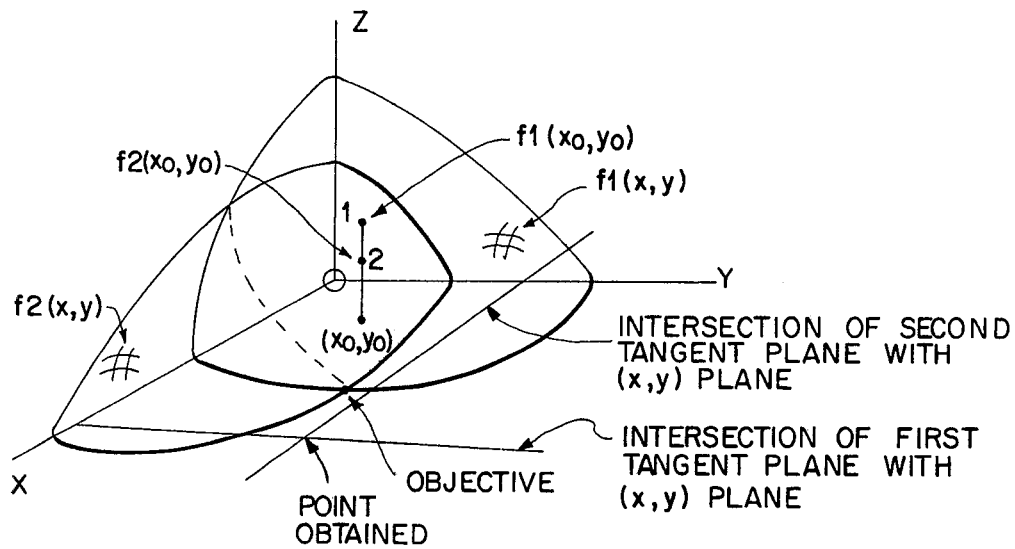
FIG. 21 is a diagram illustrating the object of the mathematical solution procedure employed in the program of Appendix A.

These represent movements along the tangent planes at 1 and 2 of FIG. 21. The intersection of these tangent planes with the (x,y) plane is achieved by making:

$$\begin{aligned} \Delta f1 &= -f1 \ (xo, yo) \\ \Delta f2 &= -f2 \ (xo, yo) \end{aligned} \Biggr\} \quad (3)$$

and, in general, this will be a better approximation to the solution of the simultaneous equations, (1)

Now, solving equations (2) for $(\Delta x, \Delta y)$, $$\begin{bmatrix} \Delta x \\ \Delta y \end{bmatrix} = \begin{bmatrix} \frac{\partial f1}{\partial x} & \frac{\partial f1}{\partial y} \\ \frac{\partial f2}{\partial x} & \frac{\partial f2}{\partial y} \end{bmatrix}^{-1} \cdot \begin{bmatrix} \Delta f1 \\ \Delta f2 \end{bmatrix} = J^{-1} \begin{bmatrix} \Delta f1 \\ \Delta f2 \end{bmatrix} \quad (4)$$

J is called the Jacobean matrix of the transformation from (x, y) to (f1, f2). Substituting from (3):

$$\begin{bmatrix} \Delta x \\ \Delta y \end{bmatrix} = -J^{-1} \begin{bmatrix} f1 \ (xo, yo) \\ f2 \ (xo, yo) \end{bmatrix} \quad (5)$$

Thus, the new values of (x, y) are:

$$\begin{bmatrix} x1 \\ y1 \end{bmatrix} = \begin{bmatrix} xo \\ yo \end{bmatrix} - J^{-1} \begin{bmatrix} f1(xo, yo) \\ f2(xo, yo) \end{bmatrix} \quad (6)$$

$$(B' = B - D)$$

This can be generalized to any number of functions.

It is to be noted that the front and rear membranes secured to the target frame 22 of FIG. 2 may comprise separate sheets of material, each fastened to one face of the frame. However, a single sheet could also be employed, wrapped around the target frame. Further, it is preferred that the "position measuring" transducers (such as shown in FIGS. 3–4) be arranged to that the respective axes of the hemispherical domes covering the piezoelements intersect at the origin of the arc along which the transducers lie. Such orientation of the transducers is not essential but does serve to minimize transducer-induced timing errors. With the transducer arrangement as shown in FIGS. 3–4, it is only necessary to assure that the major axis of dome 65 (i.e., a vertical line passing through the center of the elevational view of the transducer shown in FIG. 4) be substantially parallel to the front and rear flexible membranes of the target and generally pointing upwardly (assuming that the target assembly is mounted vertically with the sensor array at the bottom thereof as shown in FIG. 2). The most preferred arrangement is to have the major axis of the hemispherical dome of the transducer of FIG. 4 aligned with the dashed line shown in FIG. 2 connecting sensor 48 with center point 25.

It is also noted that there is a zone about the bull's-eye shown in FIG. 2 in which calculated "hit" positions are substantially independent of the speed of sound in air in the target chamber. It will thus be recognized by those of skill in the art that the above-described embodiment of the invention may be modified by deleting the "speed of the sound" measurement system and simply assuming an approximate value for speed of sound in air in the calculation of "hit" position. The manner in which the program of Appendix A may be amended to effect this modification will be readily recognized by those of skill in the art, since it is only necessary to substitute for the calculation of "speed of sound" a fixed "speed of sound" value.

Additional means for determining the speed of sound in air may also be employed. For example, the "speed of sound" measuring system may comprise a spark gap generator 45 as shown in FIG. 2, associated with only a single "speed of sound" sensor 46. Assuming that the time of generation of the spark at 45 is known and the distance from spark gap 45 to sensor 46 is known, the speed of sound in air can be readily determined. Those of skill in the art will also recognize the manner in which the preferred embodiment described above may be amended to effect this modification.

Still further, it may be preferred to determine the speed of sound by measuring air temperature and/or relative humidity, and calculate a value for speed of sound from these measured values.

Figure 22A:
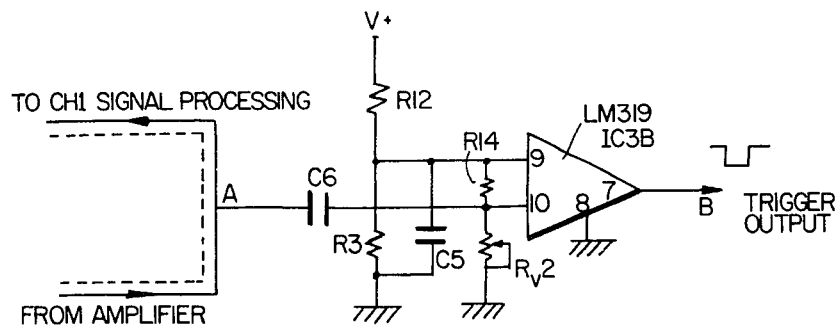
FIGS. 22A-22B comprise a preferred air temperature sensing circuit arrangement.
Figure 22B:
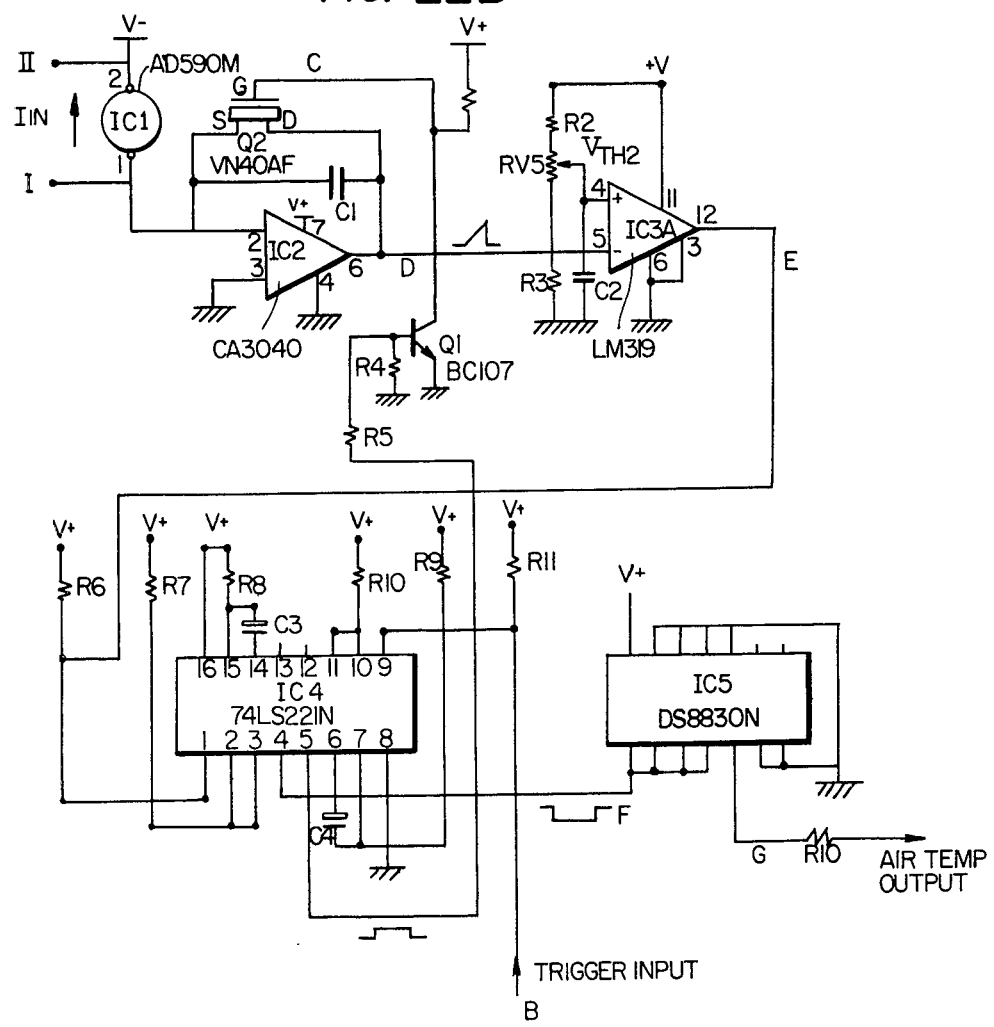

FIGS. 22A and 22B show in detail an air temperature sensing unit for providing a pulse having a length dependent on temperature. FIG. 22C shows wave forms of various points in the circuit of FIGS. 22A and 22B. The effect of the air temperature sensing unit is to generate a pulse commencing at a time $t_1$ following the time $t_o$ at which one of the "position measuring" sensors (i.e., sensor 49) detects a shock wave within the target chamber. The pulse is provided to one input of timer interface unit 124 (FIG. 17) where it is converted to a binary number representing air temperature; the computer calculates speed of sound from this number.

Referring to FIG. 22B, a temperature sensor IC1 mounted in a sensor assembly, which will be described below with reference to FIG. 22D, assumes a temperature substantially equal to that of ambient air in the vicinity of the target. Temperature sensor IC1 may be, for example, Model AD590M, available from Analog Devices Inc., P.O. Box 280, Norwood, MA 02062. Temperature sensor IC1 permits a current $I_{IN}$ to flow through it, current $I_{IN}$ being substantially proportional to the absolute temperature (in degrees Kelvin) of the semiconductor chip which forms the active element of temperature sensor IC1.

Referring again to FIG. 22A, when sensor 49 detects a shock wave generated by the bullet, a wave form similar to that shown at A in FIG. 22C is produced at the output of its associated amplifier 106 (FIG. 17). Integrated circuit chip IC3B of FIG. 22A forms a threshold detector, the threshold being set equal to that set in channel Ch1 signal processing unit 116 of FIGS. 11 and 17. Integrated circuit chip IC3 may be of type LM 319, available from National Semiconductor Corporation, Box 2900, Santa Clara, California 95051. When wave form A of FIG. 22C exceeds the preset threshold, wave form D is generated at the output of circuit chip IC3B. The leading edge (first transition) of wave form B triggers the monostable multivibrator formed by half of integrated circuit chip IC4 and the associated timing components R8 and C3. The output of this monostable multivibrator is fed via buffer transistor T1 to the gate of metal oxide semiconductor Q2, the wave form at this point being depicted as C in FIG. 22C. Transistor Q1 may be of type BC107, available from Mullard Ltd., Mullard House, Torrington, Place, London, U.K., and semiconductor Q2 may be of type VN 40AF, available from Siliconix Inc., 2201 Laurelwood Road, Santa Clara, Calif. 95054. When wave form C, which is normally high, goes low, metal oxide semiconductor Q2 changes from a substantially low resistance between its source S and drain D to a very high resistance. As a result of the current flowing through temperature sensor IC1 (proportional to its absolute temperature), the voltage at the output of integrated circuit chip IC2 starts to rise, as shown at D in FIG. 22C. The rate of rise in volts per second of wave form D is substantially proportional to the current flowing through temperature sensor IC1 and thus is proportional to the absolute temperature of temperature sensor IC1. Integrated circuit chip IC2 may be of type CA3040, available from RCA Solid State, Box 3200, Summerville, N.J. 08876. When the voltage of wave form D, which is supplied to the inverting input of comparator IC3A, rises to the preset threshold voltage $V_{TH2}$ at the non-inverting input of comparator IC3A, the output of comparator IC3A changes state as indicated in wave form E at time $t_1$. This triggers a second monostable multivibrator formed of half of integrated circuit IC4 and timing components C4 and R9. The output of this second monostable multivibrator is sent via a line driver circuit chip IC5 to a coaxial cable which connects to the input of one channel of comparator unit 124 of FIGS. 17 and 18A–18H. It will be recognized that one of input channels Ch2–Ch7 of timer interface unit 124 is connected to receive the output of the air temperature sensing unit rather than being coupled as in FIG. 17.

The operation of the air temperature sensing unit of FIGS. 22A and 22B may be mathematically described as follows (assuming that the ramp of wave form D of FIG. 22C is linear and ignoring offset voltages in the circuit, which will be small):

$$t_1 = \frac{V_{TH2}}{\frac{d}{dt} V_o} \quad (7)$$

where $V_o$ = voltage of wave form D, FIG. 22C, and $$\frac{d}{dt} V_o = \frac{I_{IN}}{C_1} \quad (8)$$

where $I_{IN}$ = current through IC1

$$I_{IN} = C\theta_K \quad (9)$$

where C is a constant of proportionality and $\theta_K$ is the absolute temperature of IC1 combining (7), (8) and (9), $$t_1 = \frac{V_{TH2} C_1}{C\theta_K} \quad (10)$$

$$\theta_K = \frac{V_{TH2} C_1}{C t_1} \quad (11)$$

Timer interface unit 124 can then measure time $t_1$ by the same procedure that is employed for measuring the time differences between outputs of sensors 48-50. Assume that timer interface unit 124 channel 5 receives the output of the air temperature sensing unit.

It will be recalled that timer interface unit 124 will start counter 5 counting up upon receipt of a pulse on channel Ch$\phi$, which is responsive to shock wave detection by sensor 49. Counter 5 will stop counting upon receipt of the pulse of wave form G from the air temperature sensing unit at time $t_1$. Thus, the count on counter 5 of the timer interface unit will be directly proportional to the absolute temperature of sensor IC1.

Figure 22D:
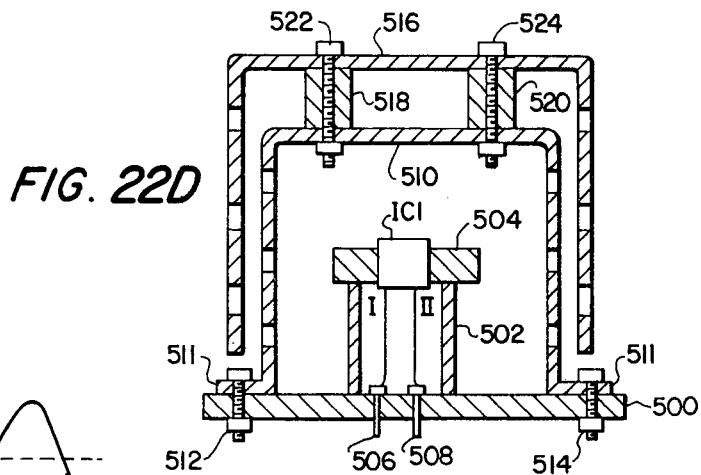
FIG. 22D shows a preferred mechanical mounting arrangement for the air temperature sensing semiconductor element of FIG. 22B.
Figure 22C:
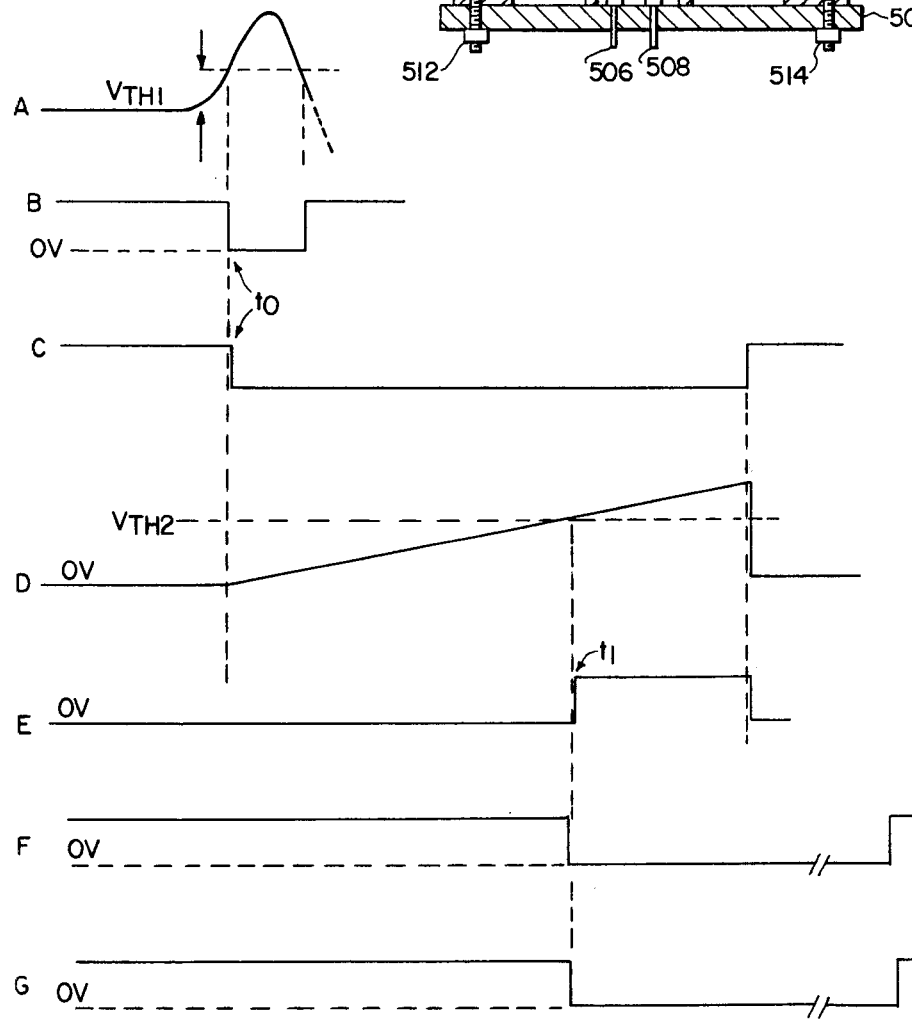
FIG. 22C shows a timing diagram for the circuit of FIGS. 22A-22B.

A preferred mounting arrangement for temperature sensor IC1 is shown in the cross-sectional elevation view of FIG. 22D. The assembly has a base plate 500, formed from ⅛" thick glass-fiber printed circuit board material. Extending upwardly from base plate 500 is a standoff pillar 502, which is drilled longitudinally to permit passage of connecting wires from temperature sensor IC1. The standoff pillar 502 may be made of any suitable insulating material, such as Nylon. Mounted at the upper end of pillar 502 is a finned clip-on heat sink 504, such as Part No. 7200-01-01, Series 7200, available from Electrobits Proprietary Ltd., 43 Ivanhoe St., Glen, Australia. Temperature sensor IC1 is then mounted in the heat sink with its leads I, II, connected to terminals 506, 508, respectively. Also mounted on the base plate 500 is an inner screen which consists of an inverted metal cup, with holes of approximately ¼ inch diameter drilled at spaced intervals through the sidewall. The metal cup may be, for example, of stainless steel of approximately ⅛ inch thickness. Inner screen 510 has a flange 511 fastened to base plate 500 by bolts 512, 514, or other suitable means. An outer screen 516 is provided around inner screen 510 for further shielding the temperature sensor IC1. Outer screen 516 also preferably consists of an inverted metal cup with holes of approximately ¼ inch diameter drilled at spaced intervals through the sidewall. The holes in the inner screen are located such that they are not directly opposite those in the outer screen, so as to prevent direct sunlight from heating the temperature sensor IC1 and to prevent wind blown rain water from striking the temperature sensor (if the sensor is not housed within the target chamber but adjacent the target). Spacers 518, 520, and bolts 522, 524 (or other suitable means) retain the outer screen 516 in the position indicated relative to the smaller-diameter inner screen 510.

The speed of sound in air may be determined from air temperature (to a reasonable approximation) with the formula:

$$V_{ST} = V_{S0^\circ C.} \sqrt{\frac{T\ K}{273}} + 0.09$$

where $V_{ST}$ is the speed of sound in air at the given temperature T, and $VS_{\phi^\circ C.}$ is the speed of sound at zero degrees Celsuis. While minor amendments to the program of Appendix A are required to effect operation of the system with the air temperature sensing unit of FIGS. 22A-22D (such as addition of a few program lines to effect calculation of speed of sound from temperature), such amendments will be apparent to the skilled artisan in light to the foregoing description.

Further modifications of the embodiments described above, within the spirit and scope of the present invention, will be apparent to those of skill in the art.

```
10 REM VERSION BIGEX4
20 REM CHANGED BY RHW 28/11/79
95 REM ******************************************************
100 REM *********************** D-957 ***********************
110 REM ************ SUPERDART 2 METRE BOX TARGET PROGRAM ***********
120 REM ******************************************************
130 REM
140 REM THIS PROGRAM COMPUTES HIT CO-ORDINATES FOR BULLETS FIRED AT ANY
150 REM VELOCITY AND RANGE USING NEWTON-
160 REM RAPHSON ITERATION TECHNIQUES
170 REM SPEED-OF-SOUND IS CALCULATED
180 REM ******************************************************
190 REM
200 REM TIMES ARE MEASURED IN MILLISECONDS; SENSOR POSITIONS, CO-ORDINATE
210 REM VALUES AND VELOCITY OF SOUND ARE EXPRESSED AS
220 REM FRACTIONS OF A NOMINAL DIMENSION
225 REM ENTERED SENSOR POSITIONS AND OUTPUT HIT POSITIONS IN MM
230 REM
240 REM ******************************************************
250 REM
260 N=3
270 REM N IS THE NUMBER OF SENSORS
280 DIM C(3,3),T(3),B(3,1),J(3,3),F(3,1),D(3,1),K(3,3),R(3,3)
284 DEF FNA(X)=(INT(X*10+0.5)/10)
286 DEF FNB(B,C)=(B-(INT(LOG(ABS(C)+1)/LOG(10))))
290 REM
300 W=1/1000
310 W0=1/W
320 REM R IS THE CLOCK FREQUENCY IN COUNTS/SEC
330 R=4988000
331 REM THE NEXT 4 CONSTANTS ARE USED IN THEODOLITE CALCULATIONS
332 M=3.14159/180
333 L1=745.945
334 L2=758.23
335 G1=22.9
336 REM Z3=0 REQUESTS THEODOLITE POSITION ANGLES PRIOR TO HIT ANGLES
337 Z3=0
340 REM ARRAY C CONTAINS SENSOR POSITIONS IN THE FORM :-
350 REM     C(I,1)=X-CO-ORDINATE OF ITH SENSOR
360 REM     C(I,2)=Y-CO-ORDINATE OF ITH SENSOR
370 REM     C(I,3)=Z-CO-ORDINATE OF ITH SENSOR
380 REM ******************************************************
390 REM ********** GET SENSOR POSITIONS ***********
400 GOSUB 2500
460 MAT R=(W)*R
470 S=2
480 REM S IS THE NUMBER OF THE REFERENCE SENSOR
490 REM
500 REM******************************************************
510 REM
520 REM J IS THE JACOBIAN MATRIX FOR THE NEWTON-RAPHSON PROCEDURE
530 REM AND K IS ITS INVERSE
540 REM
550 REM ARRAY B HOLDS THE CURRENT APPROXIMATION TO THE REQUIRED
560 REM SOLUTION IN THE FORM :-
570 REM B(1,1) IS X-COORDINATE OF HIT POSITION
580 REM B(2,1) IS Y-COORDINATE OF HIT POSITION
590 REM B(3,1) IS ARBITRARY TIMING CONSTANT
630 REM
640 REM ARRAY F IS A VECTOR OF RESIDUALS FOR THIS APPROXIMATION
650 REM
660 REM ARRAY D, CALCULATED FROM K AND F, IS SUBTRACTED FROM ARRAY B
670 REM TO GENERATE THE NEXT APPROXIMATION
672 REM ******************************************************
674 REM ********** OPTIONS ***********
690 REM GET SHOT TIMES AND SPEED OF SOUND ***********
695 GOSUB 2000
700 REM TIMES IN T(1),T(2),T(3)
710 REM SPEED OF SOUND IN B2
```

```
770 REM ********** EXPRESS SPEED OF SOUND AS FRACTION OF BEAM WIDTH ****
780 B2=B2*W
790 B=1/(B2*B2)
870 REM ********** SET UP INITIAL APPROXIMATION IN ARRAY B **************
875 IF T(3)<T(1) GOTO 885
880 B(1,1)=-500*W
882 GOTO 890
885 B(1,1)=500*W
890 REM
900 B(2,1)=0
910 B(3,1)=(B(1,1)-C(5,1))^2+(B(2,1)-C(5,2))^2+C(5,3)^2
915 B(3,1)=(-B*B(3,1))
960 REM ********** NEWTON-RAPHSON METHOD ****************************
970 I5=10
980 REM I5 IS MAXIMUM NUMBER OF ITERATIONS PERFORMED
990 REM
1000 REM ********** START OF ITERATION PROCEDURE *********************
1010 FOR I0=1 TO I5
1020 REM ********** CALCULATE VECTOR OF RESIDUALS F ******************
1030 F1=0
1040 FOR I=1 TO N
1050 GOSUB 1590
1060 F(I,1)=F
1070 REM ********** CALCULATE JACOBIAN MATRIX J **********************
1080 J(I,1)=(-2*B*(B(1,1)-C(I,1)))
1090 J(I,2)=(-2*B*(B(2,1)-C(I,2)))
1100 J(I,3)=(-2*(T(I)-B(3,1)))
1140 REM ********** CALCULATE DEGREE OF CONVERGENCE ******************
1150 F1=F1+F*F
1160 REM F1 IS ZERO IF B IS AN EXACT SOLUTION
1170 NEXT I
1180 REM ********** TEST DEGREE OF CONVERGENCE ***********************
1190 IF F1<.1E-9 GOTO 1470
1200 REM IF F1<.1 E-9 ARRAY B CONTAINS AGOOD ENOUGH APPROXIMATION
1210 REM ******************************************************************
1220 REM ********** INVERT JACOBIAN AND CALCULATE NEW APPROXIMATION ****
1230 MAT K=INV(J)
1240 FOR I=1 TO N
1242 D(I,1)=0
1243 FOR J=1 TO N
1244 D(I,1)=D(I,1)+K(I,J)*F(J,1)
1246 NEXT J
1250 B(I,1)=B(I,1)-D(I,1)
1252 NEXT I
1260 REM ******************************************************************
1270 FOR I7=1 TO 10
1280 REM
1290 REM ********** CHECK THAT NEW APPROXIMATION IS BETTER ***************
1300 F2=0
1310 FOR I=1 TO N
1320 GOSUB 1590
1330 F2=F2+F*F
1340 NEXT I
1350 IF F2<F1 GOTO 1420
1360 REM ********** IF NOT, TAKE HALF-STEP.... ***************************
1390 FOR I=1 TO N
1392 D(I,1)=.5*D(I,1)
1394 B(I,1)=B(I,1)+D(I,1)
1400 NEXT I
1405 NEXT I7
1410 REM ********** ....AND CHECK AGAIN **********************************
1420 REM ********** NOW DO ANOTHER ITERATION *****************************
1425 GOSUB 2400
1430 NEXT I0
1440 PRINT I5;"ITERATIONS COMPLETED WITHOUT CONVERGENCE"
1450 REM ******************************************************************
1460 GOTO 1490
1470 REM ********** END OF ITERATION PROCEDURE ***************************
1480 GOSUB 3000
1490 PRINT" .
```

```
4030 REM ****** AND IT OUTPUTS RESULTS INTO ARRAY (MAT C)
4040 T7=((B2/331.46)^2*273)-273
4050 REM T7 = ACTUAL TEMPERATURE WITHIN BOX
4060 T7=T7-20
4070 REM AND NOW IT IS DIFFERANCE BETWEEN NOMINAL TEMP AND ACTUAL TEMP
4075 REM USING A COEFFICIENT OF EXPANSION = 2.1*10^-5/DEGREE C
4080 T6=T7*2.1E-5
4090 REM T6 = RATE OF CHANGE TO BE APPLIED
4100 MAT C=(T6)*R
4105 MAT C=C+R
4110 REM C NOW HAS ALL VALUES CHANGED
4120 C(2,1)=R(2,1)
4130 C(2,2)=R(2,2)
4140 REM BUT WE DIDN'T WANT TO CHANGE THE REF. TRANSDUCER
4150 RETURN
9999 END
TYPE
MACRO2 (A2) SI= H:MC
```

```
0003                    *       RIGHT = RAISE RIGHT INDICATOR.
0004                    *       MIDDLE = RAISE MIDDLE INDICATOR.
0005                    *       LEFT = RAISE LEFT INDICATOR.
0006                    *       MIDRT = RAISE MIDDLE AND RIGHT INDICATORS.
0007                    *       MIDLT = RAISE MIDDLE AND LEFT INDICATORS.
0008                    *       RESET = RESET SYSTEM
0009                    *       IN:HIT= SHIFT HIT DATA FROM MEMORY TO BASIC
0010                    *       OP:BIN= OUTPUT HIT/MISS FROM BASIC TO V.D.U.
0011                    *
0012                    *.      8 OFF 16 BIT WORDS WILL BE INPUT TO MEMORY
0013                    *       FOR EVERY HIT
0014                    *
0015                    *
0016    004B                    NAM     RESET,IN:HIT,OP:BIN
        0053
        008B
0017    0011                    NAM     RIGHT,MIDDLE,LEFT,MIDRT,MIDLT
        0017
        001D
        0023
        0029
0018    0000                    REL     0
0019    0000            PSH:    REF
0020    0001            FLT:    REF
0021    0002            OPDEND  REF
0022    0003            POP:    REF
0023    0004            STR:    REF
0024    0005            VAC:    REF
0025    0006            ERR:    REF
0026    0007            ACC1    REF
0027    0008            ACC2    REF
0028    0009            BCC1    REF
0029    000A            BCC2    REF
0030    000B            PTT:    REF
0031    000C            EVL:    REF
0032    000D            FIX:    REF
0033    000E            FLAG    RES     1
0034    000F 0000       COUNT   RES     1,0
0035         0018       M1      EQU     24
0036    0010 58C0       INA     INA     M1,0
0037    0011 0800       RIGHT   ENT
0038    0012 FF12 0000          CALL    *PSH:
0039    0013 C601               LAP     1
0040    0014 FF0F 0005           CALL    *VAC:
0041    0015 C601               LAP     1
0042    0016 F218 002F          JMP     LOLLY 0044    0017 0800       MIDDLE  ENT
0045    0018 FF18 0000          CALL    *PSH:
```

```
1492 PRINT"CALCULATED HIT";TAB(22);FNA(X1);TAB(44);FNA(Y1)
1493 PRINT" CO-ORDINATES"
1510 REM *********** NOW GET NEXT SHOT ******************************
1550 GOTO 690
1570 REM ****************************************************************
1580 REM *********** SUBROUTINES ****************************************
1590 REM *********** SUBROUTINE FOR CALCULATING ARRAY F *****************
1600 Z4=F=T(I)-B(3,1)
1602 Z3=F=F^2
1610 Z6=B(1,1)-C(I,1)
1620 Z6=Z6^2
1630 Z7=B(2,1)-C(I,2)
1640 Z7=Z7^2
1650 Z8=C(I,3)^2
1660 Z9=Z8+Z7+Z6
1662 Z9=Z9*B
1670 F=F-Z9
1800 RETURN
1810 REM ****************************************************************
2000 REM *********** SUBROUTINE TO GET TIMES ****************************
2010 PRINT
2020 CALL(3)
2075 PRINT TAB(20);"F I R E !"
2078 PRINT
2080 CALL(4,Z,A2,T7,T6,T5,T4,T3,T2,T1)
2090 T(1)=(T1-T2)*1000/R
2100 T(2)=(T1-T1)*1000/R
2110 T(3)=(T1-T3)*1000/R
2260 B3=(32768+A2)*1000/R
2270 B2=S9/B3
2271 PRINT
2272 PRINT
2273 PRINT
2274 PRINT
2275 REM  NOW GO AND CALCULATE TRANSDUCER POSITIONS
2277 GOSUB 4000
2280 PRINT "SENSOR TIMINGS IN MILLISECS"
2290 PRINT T(1);T(2);T(3)
2300 PRINT
2310 PRINT "SPEED OF SOUND TIMING";B3;"MILLISECS"
2320 PRINT "CALCULATED SPEED OF SOUND";B2;"MM/MSEC"
2340 PRINT"ITERATION         X                Y               CONVERGENCE"
2350 PRINT
2360 RETURN
2400 REM ********* SUBROUTINE TO PRINT RESULTS ******************
2410 X1=B(1,1)/W
2420 Y1=B(2,1)/W
2430 PRINT TAB(3);I0;TAB(15);X1;TAB(31);Y1;TAB(48);F1
2440 RETURN
2500 REM ********** SUBROUTINE TO GET SENSOR POSITIONS *******************
2800 PRINT
2890 REM NOMINAL POSITIONS OF TRANSDUCERS AT TEMPERATURE OF 20
2900 REM DEGREES CENTIGRADE. DIMENSIONS IN MM
2910 DATA -843,-985,0
2915 DATA 0,-1300,0
2920 DATA 843,-985,0
2930 MAT READ R
2940 REM R IS THE REFERANCE TRANSDUCER POSITIONS
2950 S9=450
2960 REM  S9=SPEED OF SOUND TRANSDUCER SEPARATION
2990 RETURN
3000 REM ******SUBROUTINE FOR MEASURED HIT POSITION ******
3030 PRINT" "
3100 R(1,Z0)=X1
3110 R(2,Z0)=Y1
3120 GOTO 7990
4000 REM ******* THIS ROUTINE COMPENSATES FOR TRANSDUCER MOVEMENT
4010 REM ******* DUE TO CHANGES IN BEAM TEMPERATURE. REQUIRES
4020 REM ******* INPUT OF VEL. OF SOUND IN M/S, REF. ARRAY (MAT R)
```

```
0046  0019 C601            LAP    1
0047  001A FE15 0005       CALL   VAC:
0048  001B C602            LAP    2
0049  001C F212 002F       JMP    LOLLY 0051  001D 0800     LEFT   ENT
0052  001E FF1E 0000       CALL   *PSH:
0053  001F C601            LAP    1
0054  0020 FF1B 0005       CALL   *VAC:
0055  0021 C604            LAP    4
0056  0022 F20C 002F       JMP    LOLLY 0058  0023 0800     MIDRT  ENT
0059  0024 FF24 0000       CALL   *PSH:
0060  0025 C601            LAP    1
0061  0026 FF21 0005       CALL   *VAC:
0062  0027 C603            LAP    3
0063  0028 F206 002F       JMP    LOLLY 0065  0029 0800     MIDLT  ENT
0066  002A FF2A 0000       CALL   *PSH:
0067  002B C601            LAP    1
0068  002C FF27 0005       CALL   *VAC:
0069  002D C606            LAP    6
0070  002E F200 002F       JMP    LOLLY 0072  002F FA08 0038 LOLLY JST    OUTPUT
0073  0030 E20F 0040       LDX    DELAY
0074  0031 0150            IAR
0075  0032 3141 0031       JAN    $-1
0076  0033 0128            IXR
0077  0034 3843 0031       JXN    $-3
0078  0035 B20B 0041       LDA    INDIC
0079  0036 FA01 0038       JST    OUTPUT
0080  0037 F734 0003       JMP    *POP:

0082  0038 0800     OUTPUT ENT
0083  0039 402C            SEL    5,4
0084  003A 6C28            OTA    5,0
0085  003B 9A05 0041       STA    INDIC
0086  003C C600            LAP    0
0087  003D 402C            SEL    5,4
0088  003E 6C28            OTA    5,0
0089  003F F707 0038       RTN    OUTPUT 0091  0040 FFFD     DELAY  DATA   -3
0092  0041 0000     INDIC  RES    1,0

0094  0042 0800     RST    ENT
0095  0043 0000            NOP
0096  0044 44C7            SEA    M1,7     RESET INTERRUPTS
0097  0045 44C2            SEA    M1,2     RESET COUNTER 8
0098  0046 44C4            SEA    M1,4     RESET COUNTERS 1 TO 7
0099  0047 44C1            SEA    M1,1     ENABLE CHANNEL 8
0100  0048 0000            NOP
0101  0049 0AC0            EIN
0102  004A F708 0042       RTN    RST
0103  004B 0800     RESET  ENT
0104  004C FF4C 0000       CALL   *PSH:    SAVE RETURN
0105  004D C601            LAP    1
0106  004E FF49 0005       CALL   *VAC:    CHECK PARAMETER COUNT
0107  004F FE0D 0042       JST    RST
```

```
0108  0050 0110                ZAR                  CLEAR TO SHOOT
0109  0051 9E43 000E           STA      FLAG
0110  0052 F74F 0003           JMP      *POP:
0111  0053 0800       IN:HIT   ENT
0112  0054 FF54 0000           CALL     *PSH:       SAVE RETURN
0113  0055 C60A                LAP      10
0114  0056 FF51 0005           CALL     *VAC:       CHECK COUNT
0115  0057 5801       HOLD     ISA                  I/P CONSOLE SENSE REG
0116  0058 C00E                CAI      14          CHECK FOR "E"
0117  0059 F203 005D           JMP      ESCAPE      GET OUT IF IT IS
0118  005A 49C7                SEN      M1,7        MODULE READY?
0119  005B F20A 0066           JMP      PASS        DATA AVAILABLE
0120  005C F605 0057           JMP      HOLD        NO, GO ROUND AGAIN
0121  005D C708       ESCAPE   LAM      8
0122  005E 9E4F 000F           STA      COUNT
0123  005F 0110                ZAR
0124  0060 FA1E 007F           JST      PASSV
0125  0061 DE52 000F           IMS      COUNT
0126  0062 F603 005F           JMP      $-3
0127  0063 B655 000E  END      LDA      FLAG
0128  0064 FA1A 007F           JST      PASSV
0129  0065 F762 0003           JMP      *POP:       BACK TO BASIC
0130                           *
0131                           * PASS 7 VALUES TO BASIC
0132                           *
0133  0066 C707       PASS     LAM      7
0134  0067 9E58 000F           STA      COUNT
0135  0068 B658 0010           LDA      INA
0136  0069 9A00 006A           STA      HERE
0137  006A            HERE     RES      1
0138  006B AA2E 009A           XOR      MASK1
0139  006C FA12 007F           JST      PASSV
0140  006D DE03 006A           IMS      HERE
0141  006E DE5F 000F           IMS      COUNT
0142  006F F605 006A           JMP      HERE
0143  0070 FE2E 0042           JST      RST
0144  0071 C705                LAM      5
0145  0072 9A0A 007D           STA      LOOP:C
0146  0073 B20A 007E  LOOP     LDA      NO
0147  0074 0150                IAR
0148  0075 3141 0074           JAN      $-1
0149  0076 DA06 007D           IMS      LOOP:C
0150  0077 F604 0073           JMP      LOOP
0151  0078 58C7                INA      M1,7
0152  0079 AA20 009A           XOR      MASK1
0153  007A FA04 007F           JST      PASSV
0154  007B F618 0063           JMP      END
0155  007C 0000                NOP
0156  007D            LOOP:C   RES      1
0157  007E 8000       NO       DATA     :8000
0158  007F 0800       PASSV    ENT
0159  0080 FF7F 0001           CALL     *FLT:
0160  0081 FF76 000B           CALL     *PTT:
0161  0082 3106 0089           JAN      ER
0162  0083 FF77 000C           CALL     *EVL:
0163  0084 B77B 0009           LDA      *BCC1
0164  0085 9C00 0000           STA      @0
0165  0086 B77C 000A           LDA      *BCC2
0166  0087 9C01 0001           STA      @1
0167  0088 F709 007F           RTN      PASSV
0168  0089 FF83 0006  ER       CALL     *ERR:
0169  008A C6D7                DATA     'FW'
0170  008B 0800       OP:BIN   ENT
0171  008C FF8C 0000           CALL     *PSH:
0172  008D C602                LAP      2
0173  008E FF89 0005           CALL     *VAC:
0174  008F FF84 000B           CALL     *PTT:
0175  0090 3108 0099           JAN      ERROR
0176  0091 FF85 000C           CALL     *EVL:
```

```
0177  0092 FF85 000D        CALL  *FIX:
0178  0093 B78C 0007        LDA   *ACC1
0179  0094 493B             SEN   7,3
0180  0095 F601 0094        JMP   $-1
0181  0096 6C38             OTA   7,0
0182  0097 493B             SEN   7,3
0183  0098 F601 0097        JMP   $-1
0184  0099 F796 0003  ERROR JMP   *POP:
0185  009A 7FFF       MASK1 DATA  :7FFF    INVERT 15 BITS
0186  009B 0800      PATCH1 ENT
0187  009C C080             CAI   :80
0188  009D F702 009B        RTN   PATCH1
0189  009E C08A             CAI   :8A
0190  009F F704 009B        RTN   PATCH1
0191  00A0 0000             RES   10,0
0192  00AA DE0F 009B        IMS   PATCH1
0193  00AB F710 009B        RTN   PATCH1
0194                        END
```

We claim:

1. Target apparatus, comprising:
a framework;
at least one sheet of material, capable of being penetrated by a projectile, covering said framework to form a chamber;
a plurality of transducers for detecting shock or pressure waves in said chamber caused upon penetration of said at least one sheet of material by said projectile, said transducers being positioned at respective spaced-apart locations within said chamber and lying on only a portion of an arc of a circle lying in a region where said transducers are protected from being hit by said projectile;
means responsive to said transducers for measuring time differences between instants of detection of a shock or pressure wave by said transducers; and
means responsive to said time difference measuring means for determining and indicating a location at which said projectile penetrated said at least one sheet of material.

2. Target apparatus according to claim 1, wherein three said transducers are provided.

3. Target apparatus according to claim 1, further comprising a bull's-eye or aiming mark located relative to said sheet of material, wherein said bull's-eye or aiming mark is aligned with a center point of said circle.

4. Target apparatus according to claim 1, wherein said location determining means further comprise means for measuring the propagation velocity of sound in air within said chamber.

5. Target apparatus according to claim 4, wherein said propagation velocity measuring means comprises:
means for transmitting a sound pulse;
means spaced from said transmitting means for detecting said sound pulse; and
means responsive to said sound pulse detecting means for measuring a time taken for said sound pulse to travel a known distance and for determining therefrom the propagation velocity of sound in air within said chamber.

6. Target apparatus according to claim 5, wherein said detecting means comprises a pair of transducers spaced at said known distance from one another.

7. Target apparatus according to claim 5, wherein said detecting means comprises a transducer spaced at said known distance from said sound pulse transmitting means.

8. The target apparatus of claim 5, wherein said means for transmitting a sound pulse consists of a spark gap discharge means for generating a fast rise time airborne pressure wave.

9. The target apparatus of claim 8, wherein said means for transmitting a sound pulse further comprises a high voltage pulse generator connected to said spark gap discharge means, said high voltage pulse generator consisting of:
an optical coupler;
an electric current control means connected to receive input signals from said optical coupler;
a high voltage impulse transformer for connecting said electric current control means to said spark gap discharge means.

10. The target apparatus of claim 5, wherein said means for detecting said sound pulse consists of:
an outer housing;
a coaxial connecting cable extending into an opening in said housing;
a piezoelectric disk positioned in a recess formed in said housing;
a finge gauge conductive wire connecting said piezoelectric disk to said coaxial connecting cable.

11. The target apparatus of claim 5, wherein each of said plurality of transducers has an associated low-noise, wide-band amplifier positioned proximate to its associated transducer.

12. The target apparatus of claim 5, wherein said means for transmitting a sound pulse and said means spaced from said transmitting means are positioned in a sensor support beam, said sensor support beam extending along a lower portion of said target chamber.

13. The target apparatus of claim 5, wherein said means responsive to said sound pulse detecting means includes means for amplifying, filtering and detecting signals from said sound pulse detecting means.

14. Target apparatus according to claim 4, wherein said propagation velocity measuring means comprises:
means for measuring the temperature and relative humidity or air within said chamber, and
means responsive to said means for measuring the temperature and relative humidity or air within said chamber, for calculating a value representing the propagation velocity of sound in air within said chamber.

15. Target apparatus according to one of claims 1 or 4, wherein said transducer locations vary with temperature, and said location determining and indicating means further compensates for variation of said transducer locations with temperature.

16. Target apparatus according to claim 4, wherein said propagation velocity measuring means comprises:
   means for measuring the temperature of air within said chamber; and
   means, responsive to said means for measuring the temperature of air within said chamber, for calculating a value representing the propagation velocity of sound in air within said chamber.

17. Target apparatus according to claim 1, wherein said chamber is substantially anechoic.

18. Target apparatus according to claim 1, further comprising an aiming mark located relative to said sheet of material and relative to a center point of said circle.

19. The target apparatus of claim 18, wherein the means for determining and indicating a location includes a programmed general-purpose computer.

20. The target apparatus of claim 1, wherein said plurality of transducers are mounted on a sensor support beam, said sensor support beam extending along a lower portion of said target chamber.

21. The target apparatus of claim 20, wherein at least some of said plurality of transducers are mounted on said sensor support beam by support brackets which space said transducer from said beam.

22. The target apparatus of claim 20, wherein said support beam is mounted to said frame by means of anti-vibration mountings.

23. The target apparatus of claim 1, wherein said means responsive to said transducers includes means for amplifying, filtering and detecting signals from said transducers.

24. The target apparatus of claim 1, wherein the arc of a circle on which said transducers are positioned has its center aligned with an aiming mark on said target.

* * * * *